United States Patent
Deivanayagam et al.

(10) Patent No.: US 9,424,097 B1
(45) Date of Patent: *Aug. 23, 2016

(54) DYNAMICALLY MANAGING WORKLOAD PLACEMENTS IN VIRTUALIZED ENVIRONMENTS BASED ON CURRENT USER GLOBALIZATION CUSTOMIZATION REQUESTS

(71) Applicant: INTERNATIONAL BUSINESS MACHINES CORPORATION, Armonk, NY (US)

(72) Inventors: Arun Deivanayagam, Austin, TX (US); Wu S. Fang, Beijing (CN); Su Liu, Austin, TX (US); Priya Paul, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/660,649

(22) Filed: Mar. 17, 2015

(51) Int. Cl.
  *G06F 9/455* (2006.01)
  *G06F 9/50* (2006.01)
  *G06F 9/48* (2006.01)

(52) U.S. Cl.
  CPC ............ *G06F 9/5083* (2013.01); *G06F 9/4881* (2013.01)

(58) Field of Classification Search
  CPC ............................... G06F 9/505; G06F 9/4881
  USPC ................................................ 718/103, 105
  See application file for complete search history.

(56) References Cited

U.S. PATENT DOCUMENTS

| | | | |
|---|---|---|---|
| 8,356,274 B2 | 1/2013 | Kwok et al. | |
| 8,521,777 B2 | 8/2013 | Nuggehalli et al. | |
| 8,539,078 B2 | 9/2013 | Duan et al. | |
| 8,704,687 B2 | 4/2014 | Clissold et al. | |
| 9,202,239 B2* | 12/2015 | Van Biljon | G06Q 30/04 |
| 2007/0234365 A1* | 10/2007 | Savit | G06F 9/505 718/104 |
| 2008/0028409 A1* | 1/2008 | Cherkasova | G06F 9/5061 718/104 |
| 2008/0270523 A1* | 10/2008 | Parmar | G06F 9/5038 709/203 |

(Continued)

FOREIGN PATENT DOCUMENTS

EP 2390784 A1 11/2011

OTHER PUBLICATIONS

IBM, "Method and Apparatus for Optimized SaaS Customization Request Analysis", IPOM000190600D, Dec. 8, 2009, 8 pages.

(Continued)

*Primary Examiner* — Phillip H Nguyen
(74) *Attorney, Agent, or Firm* — Amy J. Pattillo; Joseph Petrokaitis

(57) ABSTRACT

Multiple workloads from multiple users requesting access to at least one virtualized application are received, wherein each of the workloads is specified with one or more separate globalization characteristics from among multiple globalization characteristics. To dynamically manage workload placement, each of the workloads is dynamically categorized separately for placement in one or more particular virtualized environments from among multiple virtualized environments based on the one or more separate globalization characteristics of each of the workloads, wherein each virtualized environment comprises the at least one virtualized application configured for a separate selection of globalization services from among multiple globalization services for handling a separate selection of the one or more separate globalization characteristics.

11 Claims, 12 Drawing Sheets

(56) References Cited

U.S. PATENT DOCUMENTS

2010/0250712 A1     9/2010   Ellison et al.
2012/0130936 A1*   5/2012   Brown .................. G06N 5/048
                                                                                       706/52

OTHER PUBLICATIONS

"Method to Automate and Personalize/Configure a System for deploying the System into a Specific Landscape/Software-as-a-Service (Saas) Solution Instance", IPOM000198383D, Aug. 6, 2010, 5 pages.

"IBM Platform Resource Scheduler", available from <http://www-03.ibm.com/systems/platformcomputing/products/rs/> as of Mar. 17, 2015, 3 pages.

"Method for High Fidelity Measurement of Per VM CPU and Energy Consumption", IP.com, IPCOM000216642D, Apr. 11. 2012, 5 pages.

U.S. Appl. No. 14/732,690, filed Jun. 6, 2015, In re Deivanayagam, 60 pages.

"List of IBM Patents or Patent Applications Treated as Related", dated Jun. 6, 2015, 2 pages.

Non-Final Office Action, mailing date Dec. 11, 2015, U.S. Appl. No. 14/723,690, filed Jun. 6, 2015, In re Deivanayagam, 25 pages.

Notice of Allowance, mailing date Jun. 6, 2015, U.S. Appl. No. 14/723,690, filed Jun. 6, 2015, In re Deivanayagam, 23 pages.

\* cited by examiner

| USER NAME | USER DEFINED/REQUIRED MAJOR CODESET OPERATION IN DIFFERENT APPLICATIONS | | | | | |
|---|---|---|---|---|---|---|
| | APP 1 | APP 2 | APP 3 | APP 4 | APP 5 | APP 6 |
| USER1 | GB18030 | IBM-eucCN | UTF-8 | GB18030 | GB18030 | GB18030 |
| USER2 | UTF-8 | UTF-8 | UTF-8 | JIS | JIS | IBM-eucJP |
| USER3 | UTF-8 | UTF-8 | UTF-8 | UTF-8 | UTF-8 | UTF-8 |
| USER4 | ISO8859-1 | ISO8859-1 | ISO8859-1 | ISO8859-1 | UTF-8 | UTF-8 |
| USER5 | UTF-8 | UTF-8 | UTF-8 | JIS | JIS | IBM-eucJP |
| USER6 | UTF-8 | ISO8859-1 | ISO8859-1 | UTF-8 | UTF-8 | UTF-8 |
| USER7 | GB18030 | IBM-eucCN | UTF-8 | GB18030 | GB18030 | GB18030 |

FIG. 12

| APP | CODESET BASED APPLICATION GROUPS | | | | | |
|---|---|---|---|---|---|---|
| | UTF-8 GROUP | GB18030 GROUP | ISO8859-1 GROUP | JIS GROUP | IBM-eucJP GROUP | IBM-eucCN GROUP |
| APP1 | USER 2, 3, 5, 6 | USER 1, 7 | USER 4 | | | |
| APP2 | USER 2, 3, 5 | | USER 4, 6 | | | USER 1, 7 |
| APP3 | USER 1, 2, 3, 5, 7 | | USER 4, 6 | | | |
| APP4 | USER 3, 6 | USER 1, 7 | USER 4 | USER 2, 5 | | |
| APP5 | USER 3, 4, 6 | USER 1, 7 | | USER 2, 5 | | |
| APP6 | USER 3, 4, 6 | USER 1, 7 | | | USER 2, 5 | |

FIG. 13

DYNAMICALLY MANAGING WORKLOAD PLACEMENTS IN VIRTUALIZED ENVIRONMENTS BASED ON CURRENT USER GLOBALIZATION CUSTOMIZATION REQUESTS

TECHNICAL FIELD

The embodiment of the invention relates generally to data processing and particularly to dynamically managing workload placements in virtualized environments based on current user globalization customization requests.

DESCRIPTION OF THE RELATED ART

Service providers that provide customers with a virtualization service provide a service that allow customers to use virtualized hardware, software, and network resources within virtualized environments, where one or more of the underlying application, platform, and infrastructure resources are invisible to the customers. In one example, in a cloud computing environment, Software as a Service (SaaS) represents one service model for SaaS service providers to use to deliver a virtualization service allowing customer access to virtualized application resources, under a "pay as you go" model, where customers are billed for application resource use as the application resources are accessed and used.

BRIEF SUMMARY

Different customers may require different customizations of the services provided to customers by service providers of virtualization services. Customers requesting service from virtualization service providers may use different globalization characteristics in their use of computing resources. Globalization characteristics may include, but are not limited to, language, cultural conventions and code set selections by customers. A customer may request that virtualization service providers provide service customized for the globalization characteristics used by that customer, however, the customization of application service for the globalization characteristics may be handled by the virtualization service and transparent to the user. Therefore, there is a need for a method, system, and computer program product for dynamically managing workload placements in virtualized environments based on current user globalization customization requests.

In another embodiment, a system for dynamically managing workload placements in virtualized environments comprising a processor, coupled with a memory. The processor configured to perform the actions of receiving a plurality of workloads from a plurality of users requesting access to at least one virtualized application, each of the plurality of workloads specified with one or more separate globalization characteristics from among a plurality of globalization characteristics. The processor configured to perform the actions of selectively categorizing each of the plurality of workloads separately for placement in one or more particular virtualized environments from among a plurality of virtualized environments based on the one or more separate globalization characteristics of each of the workloads, each virtualized environment comprising the at least one virtualized application configured for a separate selection of globalization services from among a plurality of globalization services for handling a separate selection of the one or more separate globalization characteristics by: loading one or more application pool settings for a plurality of applications, each of the plurality of applications enabled for virtualization at the at least one virtualized application within the plurality of virtualized environments; loading at least one categorized rule for a platform hosting the plurality of applications, each at least one categorized rule specifying a rule for selecting at least one globalization characteristic from among the plurality of globalization characteristics for at least one application group; categorizing the plurality of applications into a plurality of categorized application groups according to the at least one categorized rule, each of the plurality of categorized application groups specified by a separate selection of at least one globalization characteristic from among the plurality of globalization characteristics; selectively assigning, according to the at least one categorized rule, a particular user to at least one particular application group in a user profile for the particular user; in response to receiving, from the particular user, at least one first workload from among the plurality of workloads, assigning the workload to the particular application group, the at least one first workload specified by a first globalization characteristic from among the plurality of globalization characteristics; determining, according to the at least one categorized rule, whether the particular application group is the right application group for handling the at least one first workload according to the first globalization characteristic; and in response to determining the particular application group is not the right application group for handling the at least one first workload, switching the at least one first workload to another application group from among the plurality of application groups according to the at least one categorized rule and assigning the another application group to the user profile for the particular user.

In another embodiment, a computer program product for dynamically managing workload placements in virtualized environments. The computer program product comprises a computer readable storage medium having program instructions embodied therewith. The program instructions are executable by a processor to cause the processor to receive a plurality of workloads from a plurality of users requesting access to at least one virtualized application, each of the plurality of workloads specified with one or more separate globalization characteristics from among a plurality of globalization characteristics. The program instructions are executable by a processor to cause the processor to selectively categorize each of the plurality of workloads separately for placement in one or more particular virtualized environments from among a plurality of virtualized environments based on the one or more separate globalization characteristics of each of the workloads, each virtualized environment comprising the at least one virtualized application configured for a separate selection of globalization services from among a plurality of globalization services for handling a separate selection of the one or more separate globalization characteristics, by comprising program instructions executable by the processor to cause the processor to: load one or more application pool settings for a plurality of applications, each of the plurality of applications enabled for virtualization at the at least one virtualized application within the plurality of virtualized environments; load at least one categorized rule for a platform hosting the plurality of applications, each at least one categorized rule specifying a rule for selecting at least one globalization characteristic from among the plurality of globalization characteristics for at least one application group; categorize the plurality of applications into a plurality of categorized application groups according to the at least one categorized rule, each of the plurality of categorized application groups specified by a separate selection of at least one globalization characteristic from among the plurality of globalization characteristics; selectively assign, according to the at least one categorized rule, a particular user to at least one particular application group in a user profile for the particular user; in response to receiving, from the particular user, at least one first workload from among the plurality of workloads, assign the workload to the particular application group, the at least one first workload specified by a first globalization characteristic from among the plurality of globalization characteristics; determine, according to the at least one categorized rule, whether the particular application group is the right application group for handling the at least one first workload according to the first globalization characteristic; and in response to determining the particular application group is not the right application group for handling the at least one first workload, switch the at least one first workload to another application group from among the plurality of application groups according to the at least one categorized rule and assigning the another application group to the user profile for the particular user.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 12 illustrates one example of a block diagram of a table specifying, by user and by application, the major code set requirement for each application;

FIG. 13 illustrates one example of a block diagram of a table specifying, by application group categorization and application, the user assignments to application groups;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
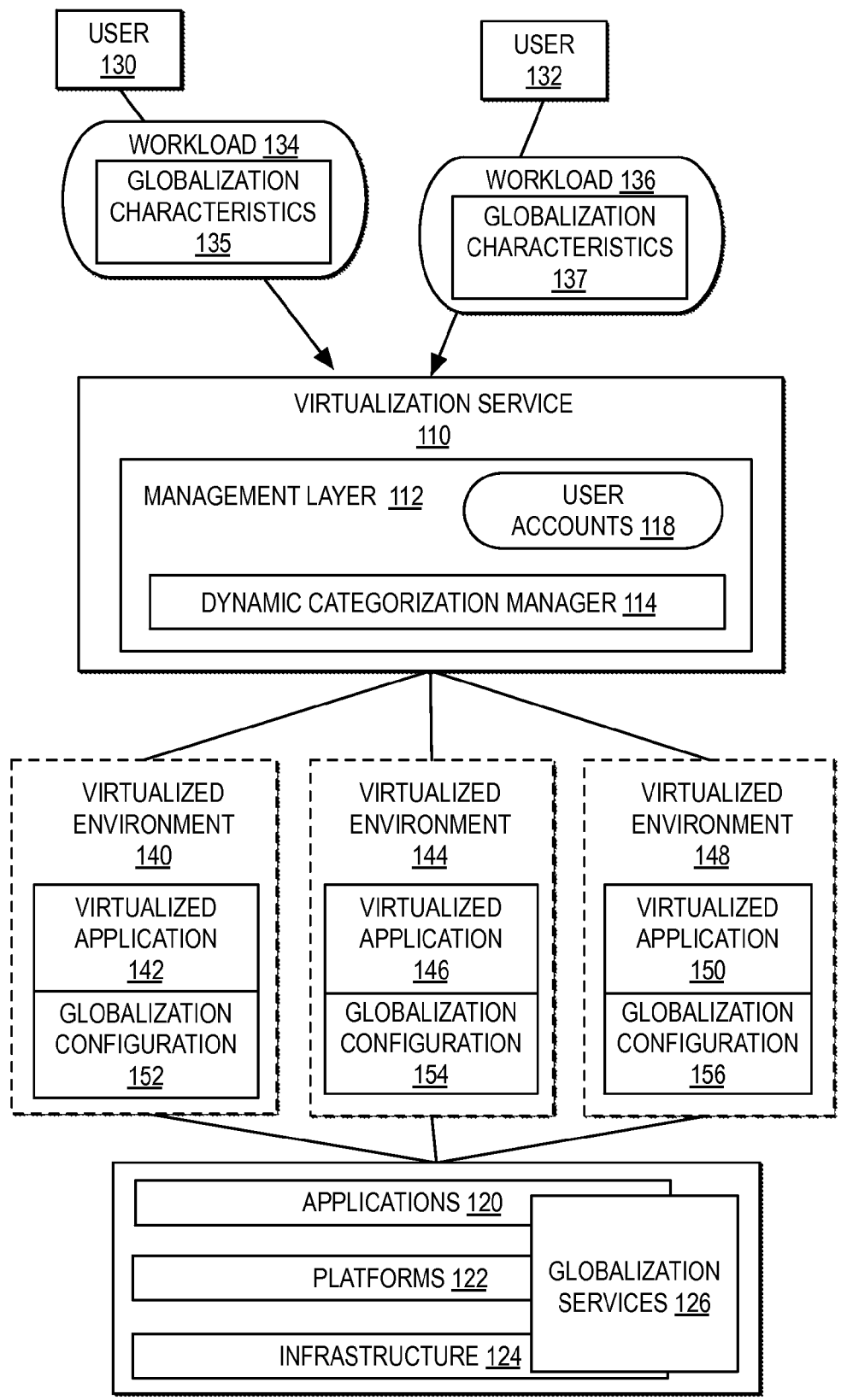
FIG. 1 illustrates one example of block diagram of a dynamic globalization manager within a management layer of a virtualization service for dynamically managing workload placements in one or more virtualized environments based on current user globalization customized requests to the virtualization service.

FIG. 1 illustrates a block diagram of one example of a dynamic globalization manager within a management layer of a virtualization service for dynamically managing workload placements in one or more virtualized environments based on current user globalization customized requests to the virtualization service.

In one example, one or more users may submit workloads to one or more virtualization services, such as virtualization service 110, through one or more network layer connections, to access one or more services provided by virtualization service 110. For example, a user 130 may submit one or more workloads, such as workload 134, to virtualization service 110 and a user 132 may submit one or more workloads, such as a workload 136, to virtualization service 110. In one example, each of workload 134 and workload 136 may represent one or more tasks, requests, data, modules, objects, or other elements that may be communicated between users and virtualization service 110 via one or more network connectivity layers. Each of user 130 and user 132 may send multiple workloads to virtualization service 110. While the example is illustrated with user 130 and user 132 sending workloads to virtualization service 110, in additional or alternate examples, a single user, additional users, or alternate users may send workloads to virtualization service 110. In one example, user 130 and user 132 may represent a single customer or multiple customers.

In one example, virtualization service 110 may represent a service or other type of component for managing access by users to virtualized selections of one or more applications 120, supported on one or more platforms 122, implemented within one or more types of infrastructure 124 through one or more virtualized environments. In one example, infrastructure 124 may include one or more infrastructure components including, but not limited to, virtual machines, hardware, software, servers, storage, load balancers and other virtual or physical resources. In one example, platforms 122 may include, but are not limited to, operating system layers, execution runtime control, database layers, web servers, middleware layers, and network support layers. Infrastructure 124 and platforms 122 may each be configured to perform one or more types of tasks including, but not limited to, system maintenance, backup, resiliency planning and globalization services.

In one example, virtualization service 110 may support access by users to one or more applications 120, support on one or more platforms 122, implemented within one or more types of infrastructure 124 based on one or more types of service models that deliver access to virtualized resources through one or more virtualized environments. Examples of service models supported by virtualization service 110 may include, but are not limited to, software as a service (SaaS), platform as a service (PaaS), and infrastructure as a service (IaaS). In one example a single service provider may provide a combination of two or more of PaaS, SaaS, and IaaS, along with additional virtualization and network services.

In one example, SaaS may represent a virtualized software service for providing users with access to application software and databases of applications 120. In one example, SaaS providers may manage platform 122 and infrastructure 124 that run applications 120; users do not manage the platform 122 and infrastructure 124 where applications 120 run, therefore users do not need to install and run applications 120 on the user's computers. SaaS may be a convenient service for use by users because the user may access an application on any computing device with an application interface, which may be provided in a browser window, and network connectivity to access virtualization service 110, without the user needing to install or maintain the application on the computing device and without the user needing to devote the underlying platform and infrastructure resources from the computing device to run the application. SaaS providers may implement a software licensing and use model in which applications 120 are centrally hosted in a cloud and a user may access and use applications 120 through a cloud client from the central host on a subscription basis. In one example, applications 120, when provided as virtualized applications or cloud applications, may consist of a selection of interrelated tasks, and configuration files, which contain dynamic information about the tasks at run time. The tasks of a virtualized application or cloud application may be cloned into multiple virtual machines, and accessible within one or more virtualized environments, and may also be removed from a virtual machine, to match workload demand.

In one example, PaaS may represent a service that delivers platform 122 as a computing platform, which may include one or more platform components such as, but not limited to, operating system, programming language, execution environment, database, and web server, and allows users to develop, run and manage applications 120 on platform 122 without the user needing to build and manage the underlying hardware and software layers of platform 122 and infrastructure 124 that may be required for developing and launching applications 120.

In one example, IaaS may represent a type of cloud computing in which a third-party provider hosts one or more physical or virtual computing resources over a network, on-demand from large pools installed in data centers, such as a service provider hosting one or more infrastructure components 124 on behalf of its users from a large data center. IaaS service providers may offer virtual machines managed by hypervisors, along with additional resources including, but not limited to, virtual machine disk image libraries, raw block storage, file or object storage, firewalls, load balancers, IP addresses, virtual local area networks (VLANs), and software bundles. IaaS providers may charge for IaaS services based on the amount of resources allocated and consumed.

In one example, virtualization service 110 may support user access to applications 120 through one or more virtualized environments, where each virtualized environment may represent a server partition of one or more virtualized applications, virtualized platform, and virtualized infrastructure resources from among applications 120, platforms 122, and infrastructure 124. In one example, multiple virtualized environments may be deployed for virtualization service 110, such as virtualized environment 140, virtualized environment 144, and virtualized environment 148. In one example, each of virtualized environment 140, virtualized environment 144, and virtualized environment 148 may represent one or more types of virtualized resources including, but not limited to, a virtual machine (VM), a logical partition (LPAR), and a workload partition (WPAR) of virtualized resources from among platforms 122 and infrastructure 124, loaded with one or more virtualized applications from among applications 120. In one example, a virtualized application may refer to a clone of the tasks and configuration files for an application. For example, virtualization service 110 may deliver access to one or more applications within applications 120 through virtualized environment 140 delivering access to a virtualized application 142, through virtualized environment 144 delivering access to a virtualized application 146, and through virtualized environment 148 delivering access to a virtualized application 150. In one example, each virtualized environment may be supported by a separate virtualized configuration from among platforms 122 and infrastructure 124. In one example, multiple virtualized environments may also share resources from among applications 120, platforms 122, and infrastructure 124. In one example, one user may access one or more virtualized environments. In addition, users may share access to a same virtualized environment. While virtualized environment 140, virtualized environment 144, and virtualized environment 148 are illustrated in the example, management layer 112 may manage additional or alternate partitions, where each partition supports an additional or alternate virtualized environment.

In one example, in supporting access by multiple users to applications 120 through one or more virtualized environments, virtualization service 110 may also need to provide customized access for each user to applications 120. To provide customized access for each user to applications 120 through one or more virtualized environments, virtualization service 110 may implement a management layer 112 to manage customized access for each user to applications 120. In one example, management layer 112 may manage metadata, user settings, and other information about each user in one or more layers, such as within management layer 112 as user accounts 118 and within one or more of the applications 120, platforms 122, and infrastructure 124 layers, to apply when customizing access for each user to applications 120. In addition, in one example, management layer 112 may detect current information, by user, in workload requests to dynamically apply when customizing access for each user to applications 120. Management layer 112 may also manage server partitioning and manage loading selected applications into each partition as a virtualized application to be accessed within a virtualized environment. The customization of service access by a user, at one or more of the application, platform, and infrastructure levels, may be transparent to each user. In one example, management layer 112 management of server partitioning may include one or more partition management functions including, but not limited to, rebalancing partitions, adding partitions, merging partitions, and migrating partitions. In one example, management layer 112 may be implemented within one or more layers of virtualization service 110 such as, but not limited to, a cloud management layer for managing a cloud service layer of virtualization service 110 or a partition management layer for managing server partitioning within virtualization server 110.

In one example, customized access for each user to applications 120 may require management of different globalization characteristics. Some of the tasks that applications 120, platforms 122, and infrastructure 124 may perform may depend on the globalization characteristics of the data and workloads being handled. In one example, globalization characteristics may include, but are not limited to, language, cultural conventions and code set selections. For applications 120, platforms 122, and infrastructure 124 to support processing of workloads, tasks, and data with different globalization characteristics, one or more layers of globalizations services 126 may be configured and implemented by one or more of applications 120, platforms 122 and infrastructure 124. Globalization services 126 may include, but are not limited to, globalization libraries, globalization settings, globalization modules, and globalization converters each identified for handling one or more types of globalization characteristics. Globalization services 126 may include files organized by locales or other globalization features. In one example, each locale may be specific to a particular language, culture, and territory, setting and may specify, for example, the name of the code set that the application data uses, the classification of the characters in the code set, the collation sequence to use of the character data, and the user format for monetary, numeric, date, time, and contact data. In addition, the types of files specified for a locale may include, for example, locale files that specify one or more of language, territory, writing direction and other cultural conventions, code set files that specify how to map each logical character in a character set to a unique bit pattern, code set conversion files that specify how to map each character in "source" code set to corresponding characters in a "target" code set, and a register files that associates code-set names and aliases with code-set numbers that specify file names of locale files and code set conversion files. In one example, code set files and code set conversion files may include characters specified according to one or more standards including, such as International Components for Unicode (ICU), globalization (GllN) libraries, and global language support (GLS). Globalization services 126 may also include services for managing globalization features of application usage and business model rules.

In one example, management layer 112 may manage customization of each virtualized application within each virtualized environment through a globalization configuration, specifying a selection of services from among globalization services 126, for each virtualized application to handle one or more globalization characteristics. For example, a globalization configuration 152 may be applied to virtualized application 142, a globalization configuration 154 may be applied to virtualized application 146, and a globalization configuration 156 may be applied to virtualized application 150.

In one example, management layer 112 may determine user globalization customization requests from one or more sources. For example, user accounts 118, for a registered user of virtualization service 110, may include a selection of globalization characteristics preferences for a user that specify the types of globalization customization from among globalization services 126 required for a user. In another example, within workload 134 and workload 136, users may include selections of globalization characteristics in the workloads, such as globalization characteristics 135 in workload 134 and globalization characteristics 137 in workload 136, where the globalization characteristics specify the types of globalization customization required from globalization services 126 for application tasks to handle the globalization characteristics of the workloads. In addition, additional or alternate communications between users and virtualization service may include information that specifies user globalization customization requests. Users may or may not be aware of the different selections of globalization characteristics present within workloads or within user accounts 118. In addition, for a particular user, the globalization characteristics required by the user within user accounts 118 may vary based on different factors, such as, but not limited to, time of day.

In one example, different configurations of globalization services 126 may require different levels of platform and infrastructure resources. For example, data processing of different languages may require different amounts of computing resources due to the size of memory buffers, CPU time, string formatting, and regular expression processing that may vary for handling different languages and code sets. Some language and code set combinations may require significantly more computing resources than other language and code set combinations. In one example, globalization services 126 may include globalization optimization engines that are each optimized for handling a particular language and code set, however, compiling and loading the globalization optimization engines may have an associated overhead and the globalization optimization engine may either not be able to handle other globalization characteristics or may operate with significant performance degradation if required to handle other globalization characteristics.

In one example, management layer 112 could manage workloads by user by assigning each user to a selected one or more partitions, loading the virtualized environments for the partitions with the virtualized applications subscribed to by the user, and loading globalization configuration 156 with a selection of globalization services 126 optimized to support a current set of globalization characteristics, where if the user sends requests that require support for different globalization characteristics, a different selection of globalization services 126 optimized to support the different globalization characteristics is loaded into a partition the user is assigned to. In one example, multiple users may be grouped into a tenant group that shares the selected one or more partitions under a particular service agreement, where each user of the tenant group may also send requests that require support for different globalization characteristics.

One potential limitation of assigning all user workloads to a selected one or more partitions, on a user basis, is that any benefit gained from globalization optimization engines that are optimized if all application tasks in a partition submit requests specified under one set of globalization characteristics, may be lost if users send workloads that require different applications and different globalization characteristics and the partition needs to handle the different applications and different globalization characteristics. In particular, a globalization optimization engine may represent a selection of globalization services 126 optimized for handling a particular set of globalization characteristics, however there may be significant overhead associated with the globalization optimization engine handling any application tasks that require customization for globalization characteristics other than the particular set of globalization characteristics that the engine is optimized for or with loading and unloading different globalization optimization engines. In addition, even if an additional or alternative globalization optimization engine were loaded for the other set of globalization characteristics, there is overhead and storage limitations associated with compiling and loading multiple globalization optimization engine into a virtualized application for different sets of globalization characteristics, where any benefit gained from the optimizations may be reduced by the additional overhead and storage of compiling and loading multiple globalization optimization engines into a virtualized application. For example, within platforms 122, one or more globalization services 126 may provide culture awareness support at the platform level through use of a globalization library, such as libiconv.a. In one example, use of the globalization library at the platform level may be automatically optimized for a particular type of locale-based support request from each application, however, if multiple applications and users are requiring different languages and different code set conversion in a same partition, the benefits of the automated optimization may be counteracted by overhead of needing to load different libraries or trying to use the optimized library to handle different languages and code set conversions from what it is optimized to handle. For example, a libiconv.a optimization algorithm can automatically optimize converter search orders for API iconv_open operations in platform 122 and infrastructure 124 levels, to increase performance by 50%, however, if multiple applications and users are requiring different languages and code set conversions in a same partition the optimization may need to be separately performed for each of the different languages and code set conversion modules, such that the benefits of the automated optimization may be counteracted by the overhead of loading the optimization operation for each of the different languages and code set conversion modules.

Another potential limitation of assigning all user workloads to a selected one or more partitions, on a user basis, is that while a virtualization service provider could limit a user to sending workload requests that are limited to a particular selection of globalization characteristics, such that the partition assigned to the user may be specified for that selection of globalization characteristics only, a user may be unaware that workloads may required different globalization characteristics and the user may experience degraded application performance when attempting to send workloads that require globalization characteristics outside the scope of the user's originally specified globalization profile. In addition, if virtualization service 110 limits a user to a globalization profile limited to particular globalization characteristics, the user may be required to use resources at the user's client system to manage globalization conversions before sending workloads to virtualization service 110. While a user's system, at the operating system level, may include functionality for loading globalization converters into memory and converting user workload globalization characteristics at the user side, not all user systems may be optimized for performing globalization conversions. In addition, performing globalization conversions at the operating system level on a user's system may requires loading the user's system memory with globalization converters and using the user's system resources to perform the conversion, which may diminish the value of the user paying to access a service from virtualization service 110.

Another potential limitation of assigning each user to a selected one or more partitions is that the partition assignments are then determined by which users are currently requesting access, rather than being determined by the application requests and globalization characteristics of current workloads, so partition management is not optimized based on the application requests and globalization characteristics in current workloads. Since some selections of complex globalization characteristics may require significantly greater amounts of computing resources for the selection of globalization services 126 required to handle the selections of globalization characteristics, if partitions are not optimized for handling the more complex globalization characteristics, there are significant impacts to performance when the incoming workloads include complex globalization characteristics.

In one example, to optimize management of the service provided by virtualization service 110 according to the applications and globalization characteristics requested in current workloads, management layer 112, or another layer of virtualization service 110, may implement a dynamic categorization manager 114. In one example, dynamic categorization manager 114 may perform one or more functions for optimizing management of application services according to current application and globalization characteristics requested in workloads by monitoring application and globalization characteristic requests, dynamically categorizing application groups specified for handling sets of globalization characteristics, dynamically categorizing users into application groups according to current globalization characteristics in workloads, and dynamically managing which applications are supported in partitions and the globalization configuration of each partition.

In one example, dynamic categorization manager 114 may optimize application group categorizations for handling particular selections of applications and globalization characteristics and categorize users into application groups based on current globalization characteristics in the user requests, to reduce globalization optimization overhead in partitions and efficiently direct workloads to partitions with globalization optimization. In one example, for an application of applications 120 may support a collaboration service of virtualization service 110, such as a cloud based social office for collaborative co-editing, file management, and contextual commenting, where each user may access the collaborative service using a user's preferred language user interface, but may also generate workload tasks that include other languages, and the users may be globally distributed in different regions. Dynamic categorization manager 114 may designate a separate application group categorization for the application for each of the language and code set combinations used, to manage one or more server partitions optimized for each application group in servers in different regions. Dynamic categorization manager 114 may categorize user requests, by language, code set, and region, and migrate the workload tasks to the correct globalization optimized server partition, in the user's region, for the language and code set combination, to minimize globalization optimization overhead and improve the efficiency of the service provided by virtualization service 110.

In one example, one or more of virtualization service 110, management layer 112, dynamic categorization manager 114, virtualized environment 140, virtualized environment 144, virtualized environment 148, applications 120, platforms 122, infrastructure 124, and globalization services 126 are deployed or managed within a cloud environment.

Figure 2:
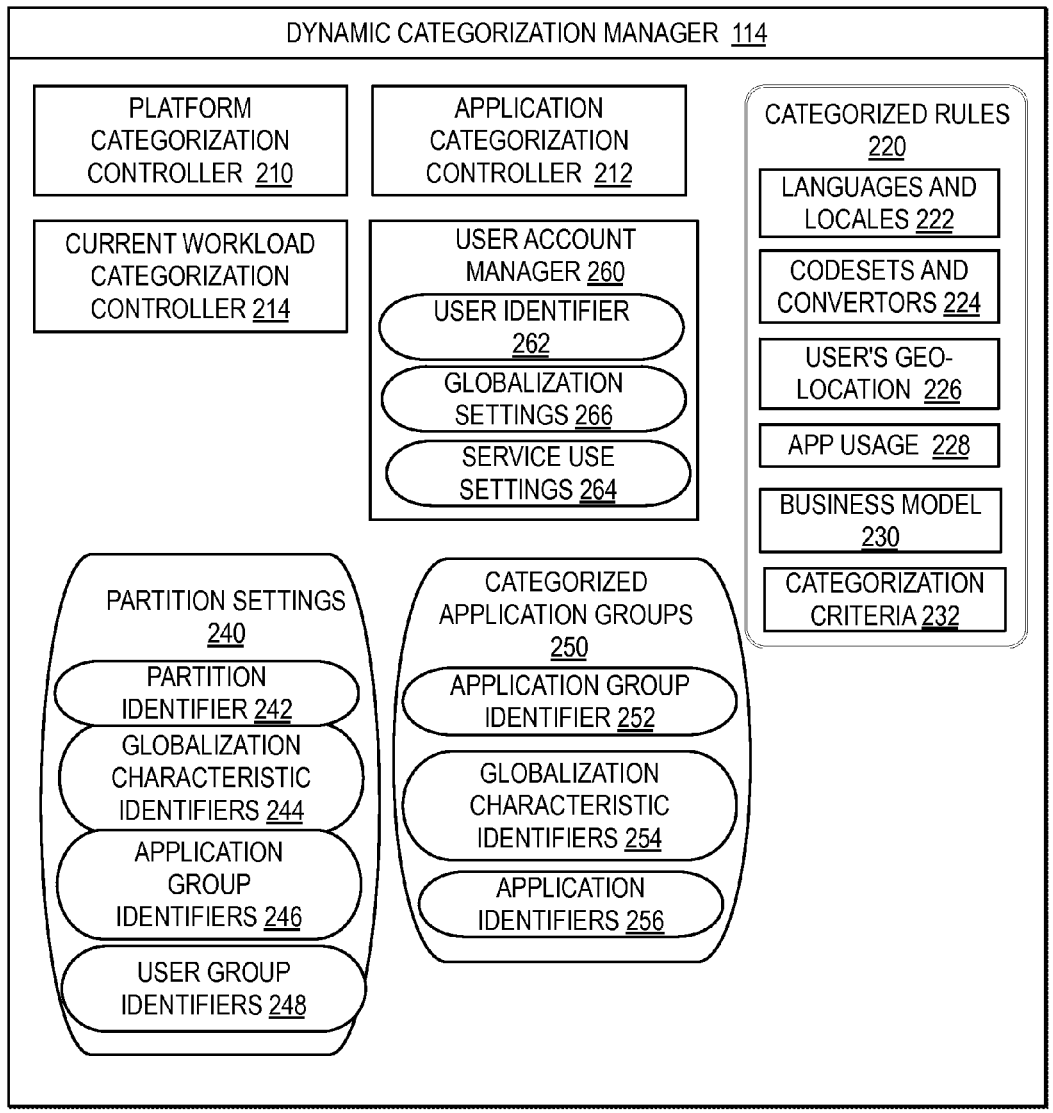
FIG. 2 illustrates one example of a block diagram of one or more components of a dynamic categorization manager for optimizing management of virtualization services according to application and globalization characteristics requested in current workloads.

FIG. 2 illustrates one example of a block diagram of one or more components of a dynamic categorization manager for optimizing management of virtualization services according to application and globalization characteristics requested in current workloads.

In one example, dynamic categorization manager 114 may include one or more components for optimizing management of virtualization services according to application and globalization characteristics requested in current workloads. The components may manage and track globalization characteristic request changes by a user and transparently migrate a user's workload from one application group to another application group. Examples of components of dynamic categorization manager 114 may include, but are not limited to, a platform categorization controller 210, an application categorization controller 212, a current workload categorization controller 214, and a user account manager 260. In addition, dynamic categorization manager 114 may access one or more categorized rules 220 that may include globalization categorization rules predefined by a service provider of virtualization service 110, predefined by users, and predefined for optimizing categorization, may dynamically manage and dynamically adjust partition settings 240 for characterizing platform partitions according to globalization characteristics, and may dynamically manage categorized application groups 250 for characteristics applications in application groups categorized by globalization characteristics.

In one example, platform categorization controller 210 may initialize, categorize, and dynamically adjust the platform partitions by adjusting the categorization assignments to each partition within partition settings 240. In one example, each partition within partition settings 240 may be identified by a separate partition identifier 242. Partitions be dynamically categorized in partition settings 240 based on one or more globalization characteristics including, but not limited to, language, geo-location, major code set, or OS type. In one example, one or more globalization characteristic identifiers 244 are assigned to each partition identifier 242 to specify the categorized one or more globalization service features for optimizing use of the globalization characteristics for each partition. For example, if prior to using a virtualized application service, a user's data was created in an AIX® (AIX is a registered trademark of International Business Machines Corporation) platform, where AIX is a version of the operating system UNIX, then platform categorization controller 210 may specify an AIX® based partition in partition settings 240 to enable the user to receive consistent AIX® code set conversion support for data processing. In another example, one or more partitions may each be categorized by one of the three major languages requested by users with a globalization characteristic identifier assignment for the globalization service feature of one of the three major languages. In another example, partitions may additionally or alternatively be dynamically categorized in partition settings 240 by application group identifiers 246. An application group identifier may include an application group identifier for an application group that is categorized by one or more globalization characteristics. Further, partitions may additionally or alternatively be dynamically categorized in partitions settings by user group identifiers 248. A user group identifier may include a group identifier for one or more users that is categorized by one or more globalization characteristics. In additional or alternate embodiments, partition settings 240 may include additional or alternate identifiers and other settings for categorizing each platform partition.

In one example, application categorization controller 212 may manage, categorize, and dynamically adjust and maintain application categorizations. One or more applications from applications 210 may be dynamically categorized based on one or more globalization characteristics including, but not limited to, language, geo-location, major code set, and OS type. In one example, application categorization controller 212 may manage application categorization as categorized application groups 250. In categorized application groups, each application group may include an application group identifier 252 and may be identified by globalization characteristic identifiers 254 of the one or more globalization characteristics by which the application group is categorized, along with application identifiers 256 of the one or more applications categorized in the application group. In additional or alternate embodiments, categorized application groups 250 may include additional or alternate identifiers and other settings for specifying categorized application groups.

In one example, user account manager 260 may manage, categorize, and dynamically adjust and maintain user accounts for customers of a virtualization service. In the example, user account manager 260 may manage a user account for each user, where a user may refer to a single user, multiple users, or a tenant group. In one example, user account manager 260 may manage a user account for each user that includes a user identifier 262, which may also include information required to authenticate the user for use of the user account. In addition, each user account may include service use settings 264 that specify service settings for the virtualization service to be provided to the user, such as billing agreements, and may include the user's current billable use of the virtualization service. In addition, each user account may include globalization settings 266 that may specify multiple types of globalization information. In one example, a user may initially set general globalization characteristics for the user's workloads and user account manager 260 may dynamically set and manage which partition identifiers and application group identifiers to assign to the user to handle the user's general globalization characteristics. User account manager 260 may monitor the globalization characteristics of the workloads submitted by the user in real time, as well as monitoring any workload migrations performed by current workload categorization controller 214 in response to the user sending workload with globalization characteristics different from the current globalization settings, and may dynamically adjust the partition identifier and application group identifier settings for a user in globalization settings 266. In one example, globalization settings 266 may include rules for directing user account manager 260 in selecting the globalization characteristics required by a user and for selecting whether to adjust the partition identifier and application group identifier associated with a user account. User account manager 260 may also adjust globalization settings 266 based on relevant rules specified in categorized rules 220. In addition, user account manager 260 may dynamically identify and manage user groups, where each user group includes one or more users, where each user group is dynamically categorized by one or more globalization characteristics, where a user group assignment for a user may be dynamically adjusted according to application and globalization characteristics of user requests. User account manager 260 may manage the current user group identifier for a user in globalization settings 266 for the user account.

In one example, current workload categorization controller 214 may manage a determination of the globalization characteristics of a workload and manage the placement of the workload in a partition specified with an application group specified for handling the globalization characteristics of the workload. In one example, current workload categorization controller 214 may compare the globalization characteristics of a current workload with the globalization settings for a user and determine whether a current user workload requires a new globalization characteristic, and if so, migrates the workload to a new partition categorized for the requested globalization characteristic. In addition, current workload categorization controller 214 may determine whether a current user workload requires another application group from the current application group setting for a user, and if so, changes the workload to another application group for use by the workload.

In one example, categorized rules 220 may include one or more types of globalization rules, specified according to one or more globalization features. In one example, categorized rules 220 is illustrated including rules categorized according to globalization features of languages and locales 222, code set and converters 224, user's geo-location 226, application (app) usage 228, and business model 230. In one example, categorized rules 220 may be further defined according to different globalization feature levels, such as, but not limited to, language family, script family, and code set family, or according to different business models, such as, but not limited to, web content services, database services, word processing services, and other business-related application services. In addition, categorized rules 220 may include categorization criteria 232, which may include rules, algorithms and other tools for application by platform categorization controller 210 for directing partition categorization, for application by application categorization controller 212 for directing application group categorization, for application by current workload categorization controller 214 for categorizing a user based on the globalization characteristics of a current workload, selecting a categorized partition, and selecting a right application group, and for application by user account manager 260 for selecting user groups and other categorization selections.

Figure 3:
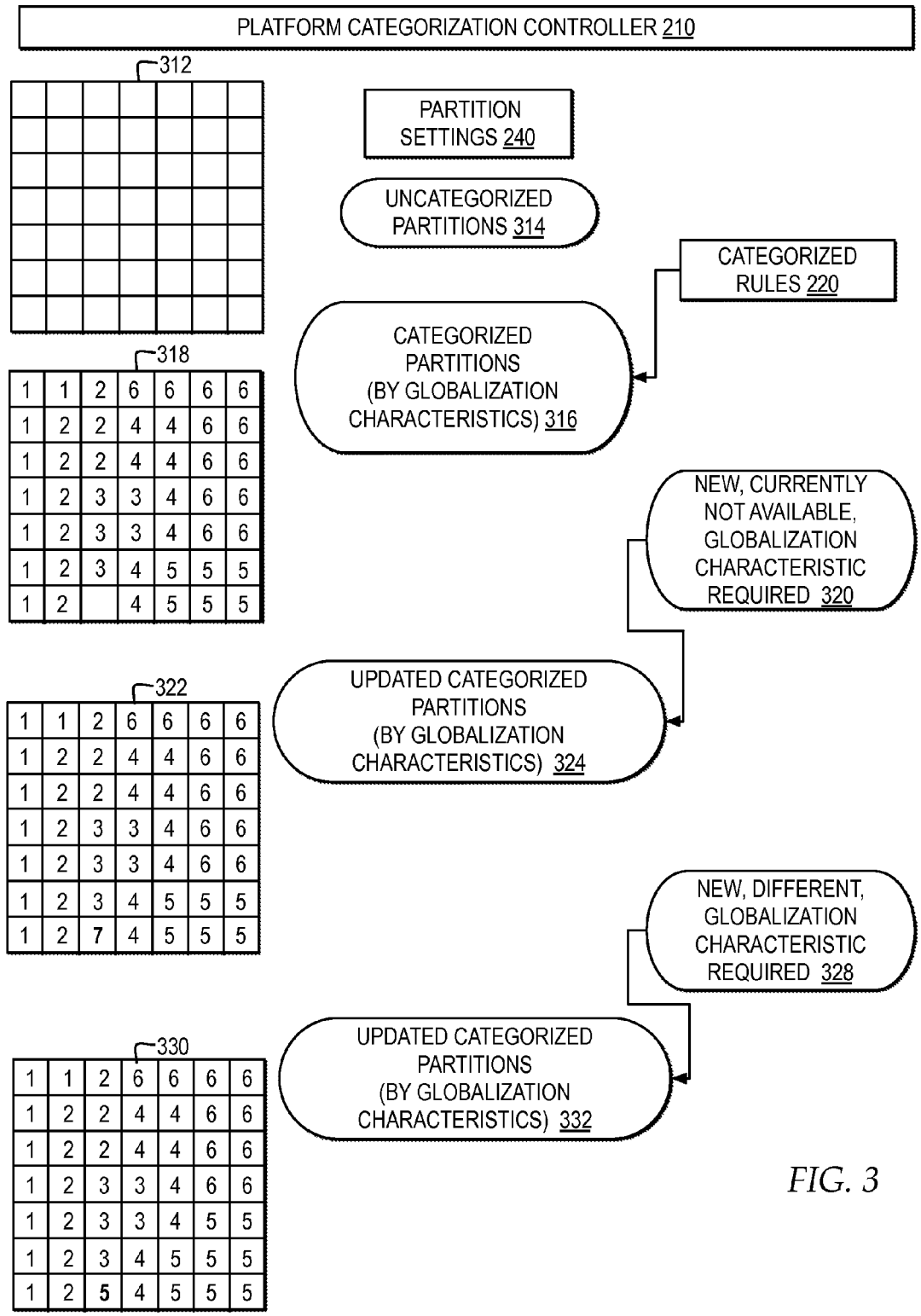
FIG. 3 illustrates one example of a block diagram of a platform categorization controller dynamically managing, categorizing, and maintaining the partition settings for a platform partition.

FIG. 3 illustrates one example of a block diagram of a platform categorization controller dynamically managing, categorizing, and maintaining the partition settings for a platform partition. In one example, FIG. 3 illustrates one example of platform categorization controller 210 updating partition settings 240. In one example, partition settings 240 may initially start as uncategorized partitions 314, illustrated at reference numeral 312, representing an uncategorized partition space. In one example, uncategorized partitions 314 may represent partition settings 240 with globalization characteristic identifier 244 and application group identifiers 246 set to null. Next, platform categorization controller 210 may apply categorized rules 220 to categorize one or more partitions within partition settings 240 into categorized partitions (by globalization characteristics) 316. For example, the partition grid illustrated at reference numeral 318 illustrates one example of the settings within dynamically categorized partitions 316, illustrated by index numbers assigned to a selection of the partitions, where each index number may represent a globalization characteristic identifier for one or more globalization characteristics. In one example, globalization characteristic identifiers may be used to specify a selection of globalization services.

In one example, platform categorization controller 210 monitors for application and globalization characteristics in a user request that trigger migration to a new partition, as managed by current workload categorization controller 214. In one example, platform categorization controller 210 may detect that a new characteristic, that is not currently available, is required, as illustrated at reference numeral 320. Platform categorization controller 210 updates partition settings, as illustrated by updated categorized partitions 324. The partition grid illustrated at reference numeral 322 illustrates one example of the settings within updated categorized partitions 324, showing the addition of index number "7" to a previously unassigned partitions, where the index number "7" is the globalization characteristic identifier for identifying the globalization characteristics in the user request.

In one example, platform categorization controller 210 may detect that a new globalization characteristic is required, that is different from the globalization characteristics needed to handle the user's current globalization settings, but already available in the partition, as illustrated at reference numeral 328. For example, the new globalization characteristic may have a globalization characteristic identifier of "5", where there are already partitions categorized with the globalization characteristic identifier of "5". Platform categorization controller 210 may determine whether to adjust the categorization of a partition to the globalization characteristic identifier of "5" or whether to select one of the partitions already assigned the globalization characteristic identifier of "5". Categorized rules 220 may include rules for platform categorization controller 210 to apply to determine whether to re-categorize a partition or change to an existing partition. In the example illustrated, platform categorization controller 210 updates partition the settings, to updated categorized partitions 332, by re-categorizing the previously categorized partition. The partition grid illustrated at reference numeral 330 illustrates one example of the settings within updated categorized partitions 332, showing the partition previously categorized as "7", dynamically categorized to "5".

Figure 4:
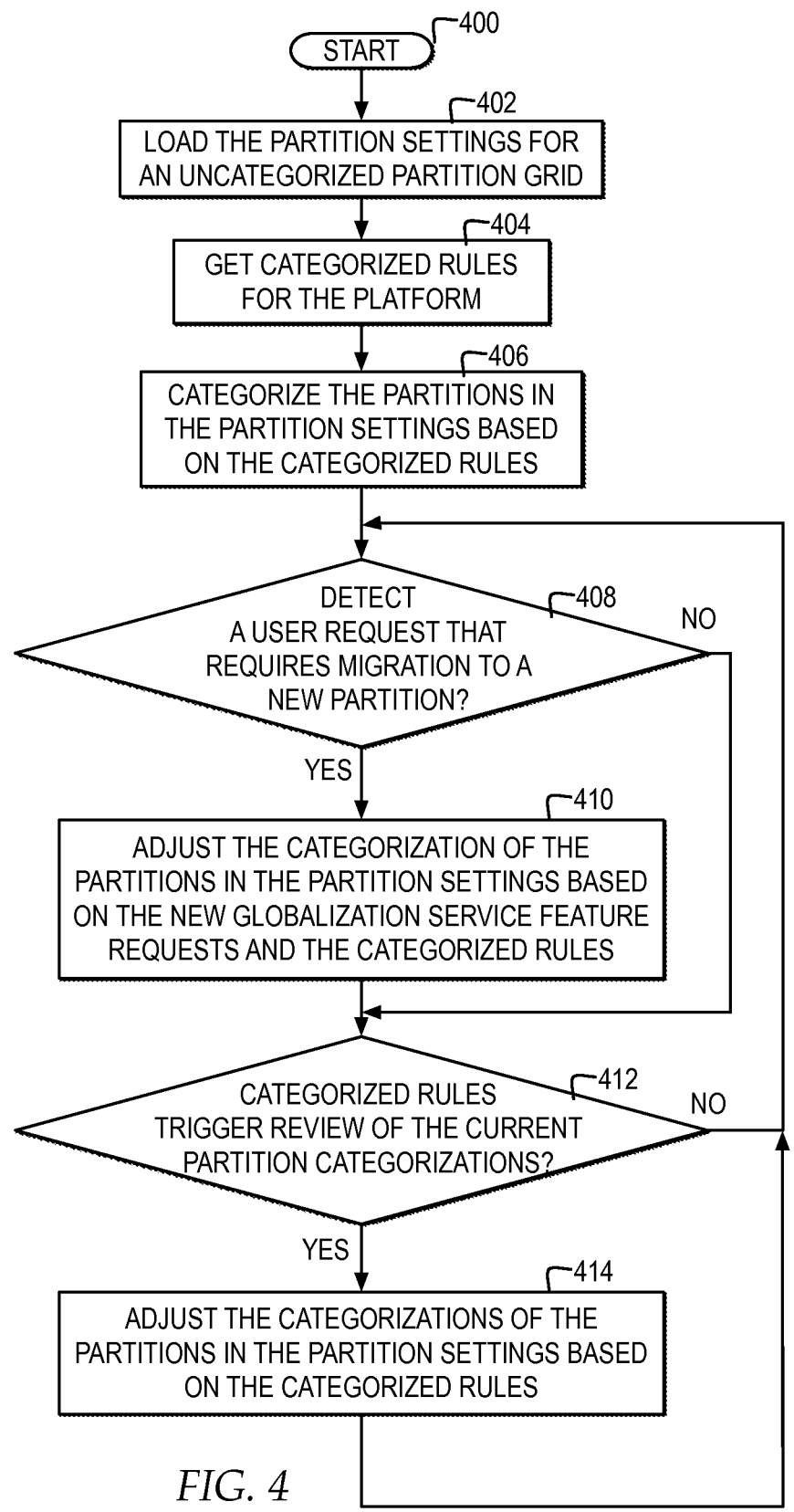
FIG. 4 illustrates a high level logic flowchart of a process and program for dynamically managing the categorization of a partition according to the globalization characteristics of current user workloads.

FIG. 4 illustrates one example of a high level logic flowchart of a process and program for dynamically managing the categorization of a partition according to the globalization characteristics of current user workloads. In one example, process and program start at block 400 and thereafter proceed to block 402. Block 402 illustrates loading the partition settings for an uncategorized partition grid. Next, block 404 illustrates getting the categorized rules for the platform. Thereafter, block 406 illustrates categorizing the partitions in the partition settings for globalization customization based on the categorized rules, wherein one or more globalization characteristics are specified for each partition. Next, block 408 illustrates a determination whether the partition categorization controller detects a user request that requires migration to a new partition because the application and globalization characteristics of the user request requires a different globalization characteristic from the globalization characteristic settings of the partition previously associated with the user. At block 408, if the platform categorization controller does not detect a user request that requires migration to a new partition, then the process passes to block 412. At block 408, if the platform categorization controller detects a user request that requires migration to a new partition, then the process passes to block 410. Block 410 illustrates adjusting the categorization of the partitions in the partition settings based on the new globalization characteristic requests and the categorized rules. In one example, adjusting the categorization of the partitions in the partition settings based on the new globalization characteristic requests and the categorized rules may include one or more of rebalancing, adding, merging, and migrating partitions based on the changes to globalization characteristics. Next, block 412 illustrates a determination whether categorized rules trigger review of the current partition categorizations. In one example, in addition to dynamically adjusting the partition as workloads are received that trigger workload migration, categorized rules 220 may include one or more rules for managing a review of the current partition categorizations. For example, categorized rules 220 may include selections of rules specified for use during different time periods, where the rules would trigger a review of the current partition categorization when one time period has ended and a new set of rules need to be applied to a current time period. At block 412, if no categorized rules have triggered a review of the current partition categorizations, then the process returns to block 408. If one or more categorized rules trigger a review of the current partition categorizations, then the process passes to block 414. Block 414 illustrates adjusting the categorizations of the partitions in the partition settings based on the categorized rules, and the process returns to block 408.

Figure 5:
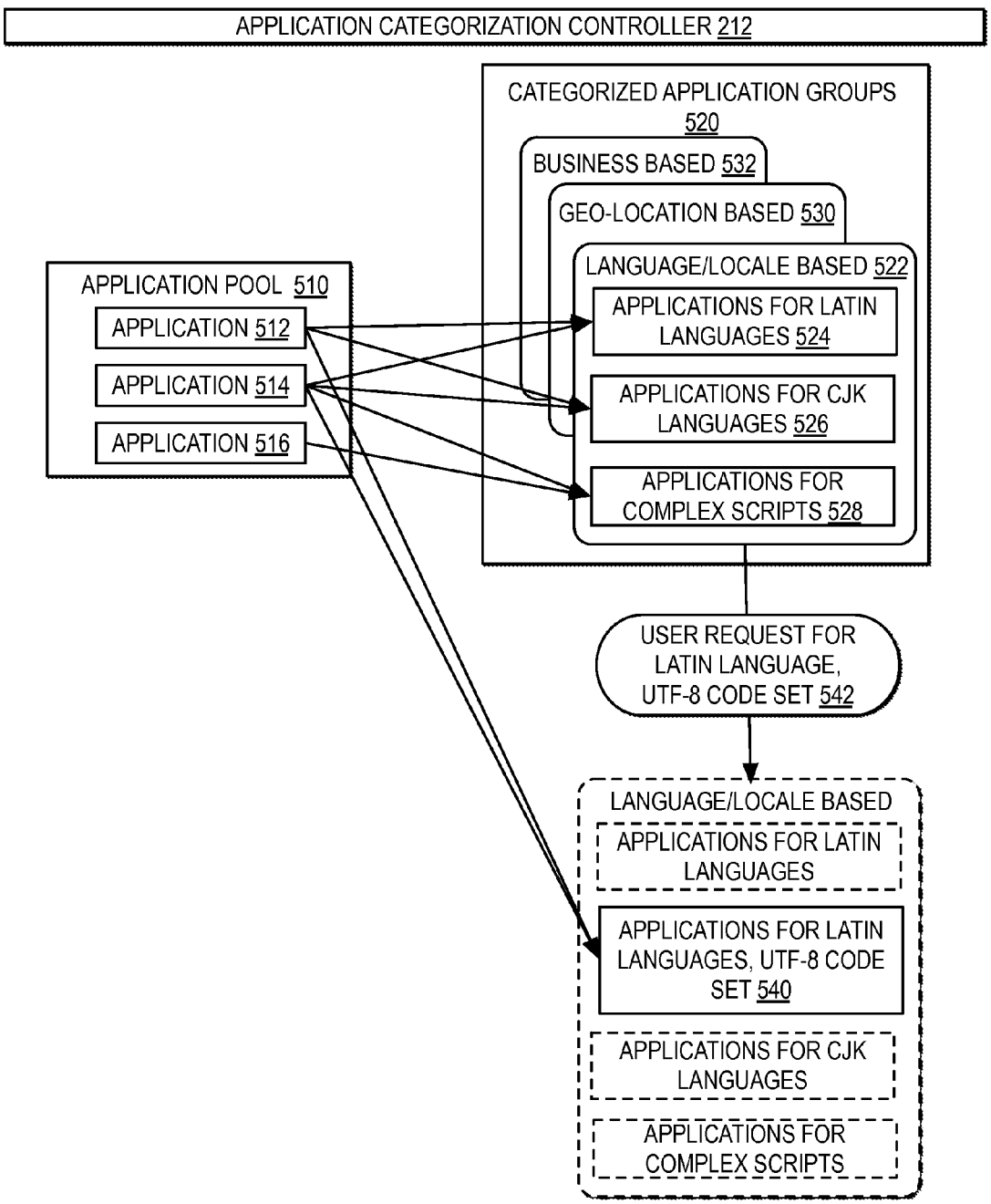
FIG. 5 illustrates one example of a block diagram of an application categorization controller dynamically managing, categorizing, and maintaining categorizations of applications in application groups.

FIG. 5 illustrates one example of a block diagram of an application categorization controller dynamically managing, categorizing, and maintaining categorizations of applications in application groups.

In one example, an application pool 510 represents a pool of applications available to be provided by virtualization service 110 to users. In one example, as illustrated, application pool 510 includes an application 512, an application 514, and an application 516. In additional or alternate embodiments, application pool 510 may include additional or alternate applications. In one example, each application in application pool 510 may represent a selection of application tasks that may be categorized in categorized application groups 520 and that may be cloned into a partition for access within a virtualized environment.

In one example, application categorization controller 212 may initially establish application groups within categorized application groups 520 and may initially categorize application into the application groups, based on categorized rules 220. In one example, each application group may be categorized by one or more globalization characteristic features. In one example, categorized application groups 520 is illustrated with application groups categorized based on different selections of globalization characteristics. For example, a selection of application groups may be categorized by language/locale based 522 globalization characteristics, such an application group serving Latin languages 524, an application group serving Chinese, Japanese, and Korean (CJK) languages 526, and an application group serving complex scripts languages 528. In one example, a selection of application groups may also be categorized by geo-location based 530 globalization characteristics and by business based 532 globalization characteristics. In additional or alternate examples, categorized application groups 520 may include categorizations based on additional or alternate globalization characteristics including, but not limited to, code sets and converters and application usage.

In addition, in additional or alternate examples, categorized application groups 520 may include categorizations based on multiple globalization characteristics. For example, a selection of applications from applications pool 510 may be first categorized based on a business model as email service related applications, and each of the email service related applications then categorized into one of the three language/locale based 522 categories based on globalization characteristics. In one example, a same email application may be customized for serving one or more of the language/locale based 522 categories by assigning the email application to different application language groups. In one example, application 512 is assigned to applications for Latin languages 524 and applications for CJK languages 526, but not to applications for complex scripts 528; application 514 is assigned to applications for Latin languages 524, applications for CJK languages 526, and applications for complex scripts 528; and application 516 is only assigned to applications for complex scripts 528.

In addition, application categorization controller 212 may monitor the application and globalization characteristic requests of current workloads, determine whether categorized application groups 520 includes application groups categorized for the application and globalization characteristic requests, and dynamically adjust the application groups and categorizations of applications in categorized application groups 520 based on the real-time application and globalization characteristic requests and categorized rules 220. For example, in the illustration, application categorization controller 212 may detect a user request with globalization characteristics of Latin language and a UTF-8 code set, as illustrated at reference numeral 542. Application categorization controller 212 may select to add a categorized application group 540 that is categorized by both the Latin language and the UTF-8 code set to optimize globalization services for requests that include both the Latin language and the UTF-8 code set. As illustrated, language/locale based 522 categories, updated with categorized application group 540, includes the same categories and settings for Latin languages 524, applications for CJK languages 526, and applications for complex scripts 528. In addition, application categorization controller 212 may assign one or more of the applications from application pool 510 to the categorized application group 540, such as assigning application 512 and application 514, as illustrated.

Figure 6:
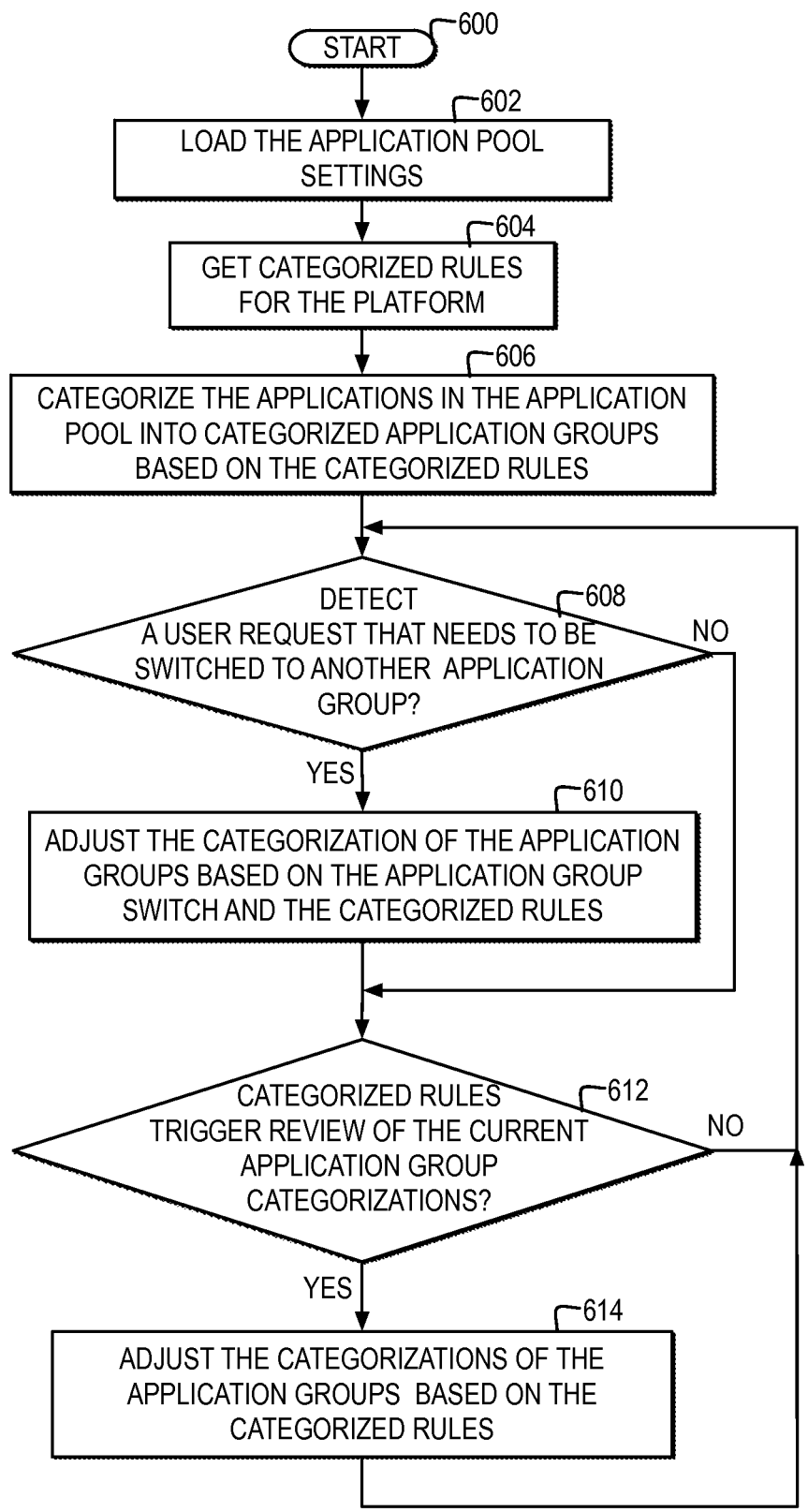
FIG. 6 illustrates one example of a high level logic flowchart of a process and program for dynamically managing the categorization of application groups according to the globalization characteristics of current user workloads.

FIG. 6 illustrates one example of a high level logic flowchart of a process and program for dynamically managing the categorization of application groups according to the globalization characteristics of current user workloads. In one example, process and program start at block 600 and thereafter proceed to block 602. Block 602 illustrates loading the application pool settings. Next, block 604 illustrates getting the categorized rules for the platform. Thereafter, block 606 illustrates categorizing the applications in the application pool into categorized application groups based on the categorized rules, wherein one or more globalization characteristics are specified for each application group. Next, block 608 illustrates a determination whether the application categorization controller detects a user request that needs to be switched to another application group. At block 608, if the application categorization controller does not detect a user request that needs to be switched to another application group, then the process passes to block 612. At block 608, if the application categorization controller detects a user request that needs to be switched to another application group, then the process passes to block 610. Block 610 illustrates adjusting the categorization of the application groups based on the application group switch and the categorized rules, and the process passes to block 612. Block 612 illustrates a determination whether categorized rules trigger review of the current application group categorizations. In one example, in addition to dynamically adjusting the application group categorizations as workloads are received that trigger switching to another application group, categorized rules 220 may include one or more rules for managing a review of the current application group categorizations. For example, categorized rules 220 may include selections of rules specified for use during different time periods, where the rules would trigger a review of the current application group categorization when one time period has ended and a new set of rules need to be applied to a current time period. At block 612, if no categorized rules have triggered a review of the current application group categorizations, then the process returns to block 608. If one or more categorized rules trigger a review of the current application group categorizations, then the process passes to block 614. Block 614 illustrates adjusting the categorizations of the application groups based on the categorized rules, and the process returns to block 608.

Figure 7:
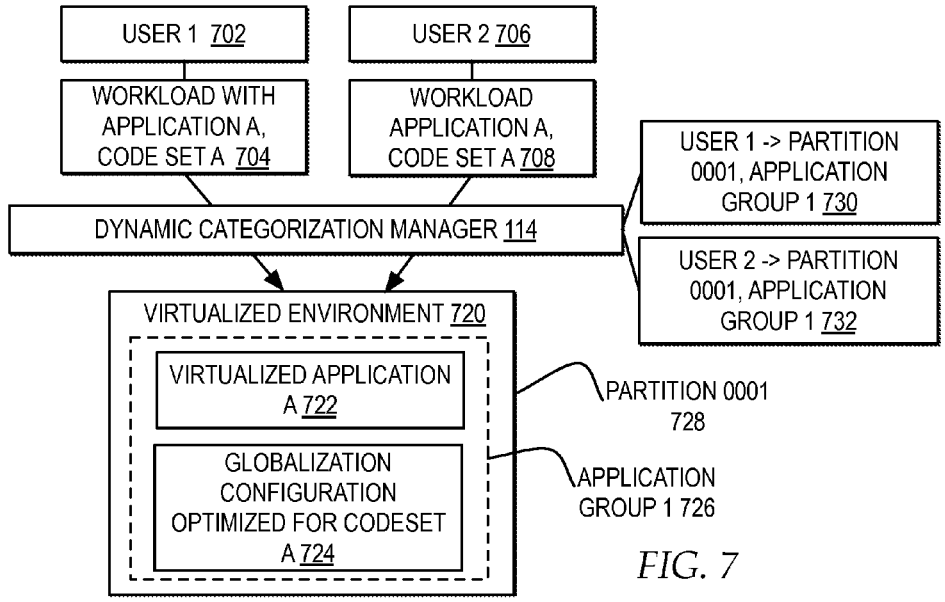
FIG. 7 illustrates one example of a block diagram of a dynamic categorization manager managing the distribution of workloads from different users with the same application and globalization characteristics to a same virtualized environment optimized for handling the application and globalization characteristics.

FIG. 7 illustrates one example of a block diagram illustrating a dynamic categorization manager managing the distribution of workloads from different users with the same application and globalization characteristics to a same virtualized environment optimized for handling the application and globalization characteristics.

In one example, a "user 1" 702 submits a workload with an application request of "application A" and globalization characteristics of "code set A", as illustrated at reference numeral 704. A "user 2" 706 submits a workload with an application request of "application A" and globalization characteristics of "code set A", as illustrated at reference numeral 708. Dynamic categorization manager 114 dynamically selects to direct the workload from "user 1" to "partition 0001" and "application group 1" 730 and dynamically selects to direct the workload from "user 2" to "partition 0001" and "application group 1" 732. In the example, the dynamic selections by dynamic categorization manager 114 of the partition to direct the workload to are based on the application and globalization characteristics requests of the workload.

In the example, as illustrated at reference numeral 726, "application group 1", which is loaded into a virtualized environment 720 representing "partition 0001", as illustrated at reference numeral 728, includes a virtualized "application A" 722 and a globalization configuration optimized for "code set A" 724. In the example, both workload 704 and workload 708 are directed to virtualization environment 720, such that both "user 1" and "user 2" share an application which is optimized for the same code set in the same partition, where the application group is virtualized in a single partition. In another example, "user 1" and "user 2" may share the application which is optimized for the same code set, but in different partitions, if the application group is virtualized in different partitions.

Figure 8:
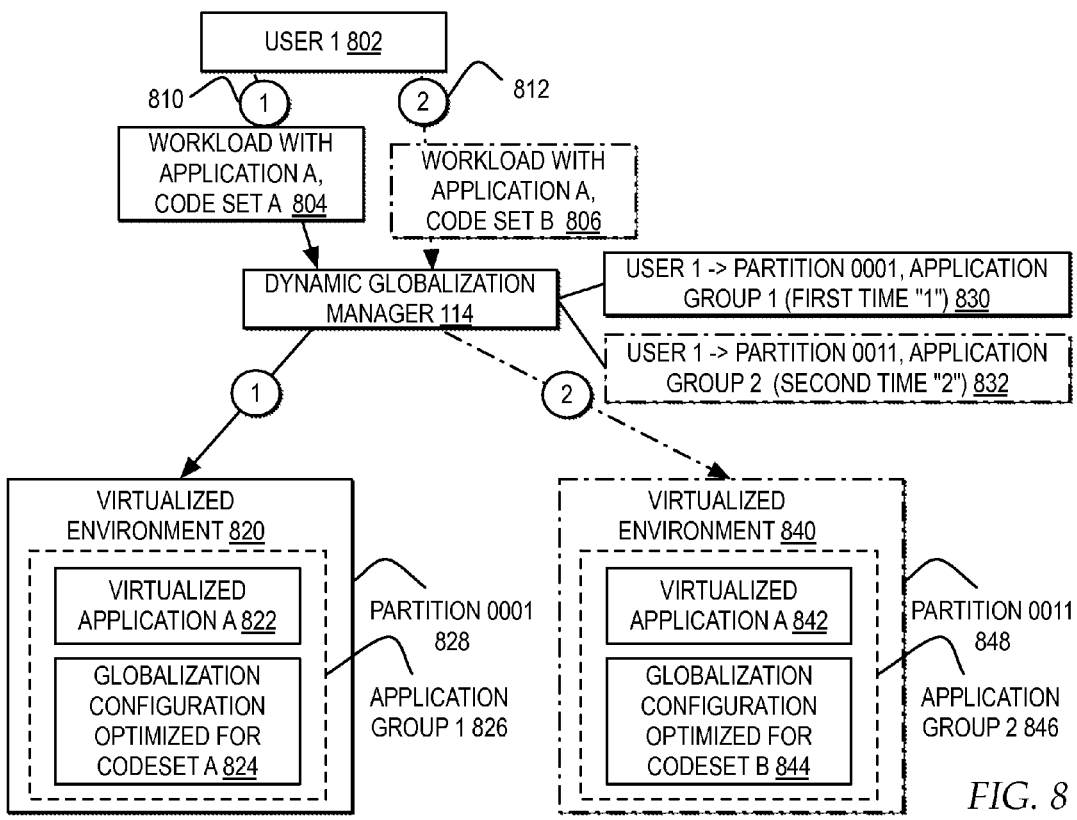
FIG. 8 illustrates one example of a block diagram of a dynamic categorization manager managing the distribution of workloads from a same user with the different application and globalization characteristics to a different virtualized environment optimized for handling the application and globalization characteristics of each workload.

FIG. 8 illustrates one example of a block diagram illustrating a dynamic categorization manager managing the distribution of workloads from a same user with the different application and globalization characteristics to a different virtualized environment optimized for handling the application and globalization characteristics of each workload.

In one example, a "user 1" 802 submits a first workload at a first time "1" initially illustrated at reference numeral 810, with an application request of "application A" and globalization characteristics of "code set A", as illustrated at reference numeral 804. In addition, at a second time "2" initially illustrated at reference numeral 812, "user 1" 802 submits a workload with an application request of "application A" and globalization characteristics of "code set B", as illustrated at reference numeral 806. For the workload received at a first time "1", dynamic categorization manager 114 dynamically selects to direct the workload from "user 1" to "partition 0001" and "application group 1" 830. Next, at a second time "2", dynamic categorization manager 114 receives the workload with globalization characteristics of "code set B", which requires a different globalization optimization service from "code set A". Dynamic globalization manager 114 dynamically migrates the workload received at a second time "2" to a different partition optimized for handling "application A" and "code set B", illustrated as "partition 0011" and "application group 2" 832. In the example, the dynamic selections by dynamic categorization manager 114 of the partitions to direct each of the workload to are based on the application and globalization characteristics requests in each of the workload.

In the example, at a first time "1", dynamic globalization manager 114 directs workload 804 to a virtualized environment 820. As illustrated at reference numeral 826, "application group 1", which is loaded into virtualized environment 820 representing "partition 0001", as illustrated at reference numeral 828, includes a virtualized "application A" 822 and a globalization configuration optimized for "code set A" 824. In the example, at a second time "2", dynamic globalization manager 114 directs workload 806 to a virtualized environment 840. As illustrated at reference numeral 846, "application group 2", which is loaded into virtualized environment 840 representing "partition 0011", as illustrated at reference numeral 848, includes a virtualized "application A" 842 and a globalization configuration optimized for "code set B" 844. In the example, both workload 804 and workload 808 are directed, based on the application and globalization characteristics of the workloads, to separate virtualization environments each with globalization configurations of globalization service features optimized to handle the globalization characteristics of each workload.

Figure 9:
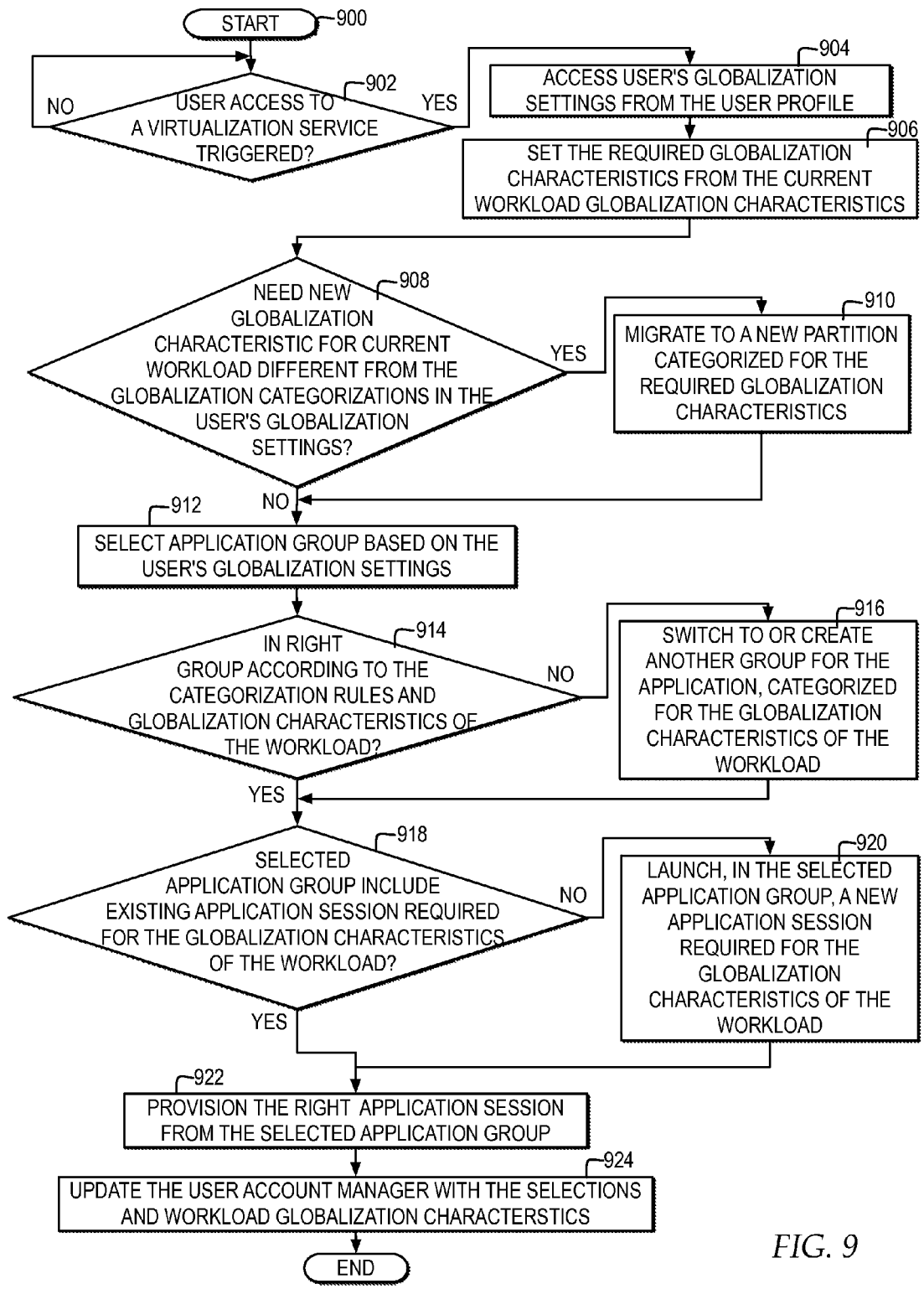
FIG. 9 illustrates one example of a high level logic flowchart of a process and computer program for dynamically managing workload distributions to virtualized environments based on globalization characteristics of workloads.

FIG. 9 illustrates a high level logic flowchart of a process and computer program for dynamically managing workload distributions to virtualized environments based on globalization characteristics of workloads.

In one example, the process and computer program start at block 900 and thereafter proceed to block 902. Block 902 illustrates a determination whether a user's access to a virtualization service is triggered, such as by a user sending a workload. At block 902, if a user access to the virtualization service is triggered, then the process passes to block 904. Block 904 illustrates accessing the user's globalization settings from the user's profile. In one example, the user's globalization settings may include user group settings, application group settings, partition settings, and other settings that indicate the previous globalization characteristics for the user. Next, block 906 illustrates setting the required globalization characteristics from the current workload globalization characteristics. Thereafter, block 908 illustrates a determination whether a new globalization characteristic for the current workload is different from the globalization categorization in the user's globalization settings. At block 908, if there is not a need for a new globalization characteristic, then the process passes to block 912. At block 908, if there is a need for a new globalization characteristics, then the process passes to block 910. Block 910 illustrates migrating the workload to a new partition categorized for the required globalization characteristics, and the process passes to block 912.

Block 912 illustrates selecting an application group based on the user's current globalization settings. In one example, the user's current globalizations settings may specify a preferred or major application group setting. Next, block 914 illustrates a determination whether the user's workload is in the right group according to the categorization rules and the globalization characteristics of the workload. At block 914, if the user's workload is in the right group, then the process passes to block 918. At block 914, if the user's workload is not in the right group, then the process passes to block 916. Block 916 illustrates switching to or creating another group for the application, categorized for the globalization characteristics of the workload, and the process passes to block 918. Block 918 illustrates a determination whether the selected application group includes an existing application session required for the globalization characteristics of the workload. At block 918, if the selected application group includes an existing application session required for the globalization characteristics of the workload, then the process passes to block 922. At block 918, if the selected application group does not include an existing application session required for the globalization characteristics of the workload, then the process passes to block 920. Block 920 illustrates launching, in the selected application group, a new application session required for the globalization characteristics of the workload, and the process passes to block 922. Block 922 illustrates provisioning the right application session from the selected application group. For example, at block 918, if a calendar application already has three sessions open under a language group for three different languages, and a user workload requests one of the languages associated with one of the three open sessions, then the right application session is provisioned from the existing open session at block 922, however, if a user workload requests a language not associated with one of the three open sessions, then the process first passes to block 920 to launch a new application session for the requested language, and then the newly launched application session is provisioned from the selected application group at block 922. Next, block 924 illustrates updating the user account manager with the selections, such as partition and application group selections, and workload globalization characteristics, and the process ends.

Figure 10:
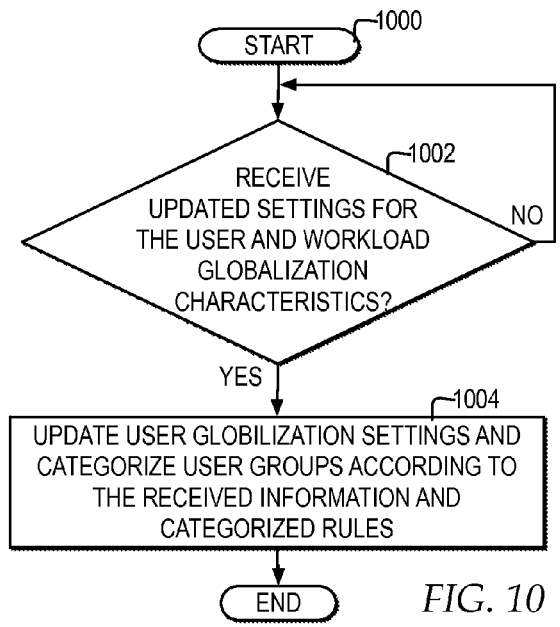
FIG. 10 illustrates one example of a high level logic flowchart of a process and computer program for managing user profiles of virtualization service users, according to real-time application and globalization characteristics requests of users.

FIG. 10 illustrates a high level logic flowchart of a process and computer program for managing user profiles of virtualization service users, according to real-time application and globalization characteristics requests of users.

In one example, the process and program starts at block 1000 and thereafter proceeds to block 1002. Block 1002 illustrates a determination whether a user account manager receives updated settings for the user and workload globalization characteristics of a current workload. At block 1002, if the user account manager receives updated settings and workload globalization characteristics of a current workload, then the process passes to block 1004. Block 1004 illustrates dynamically updating user globalization settings and categorizing user groups in the user accounts according to the updated settings and workload globalization characteristics, according to the categorized rules, and the process ends.

Figure 11:
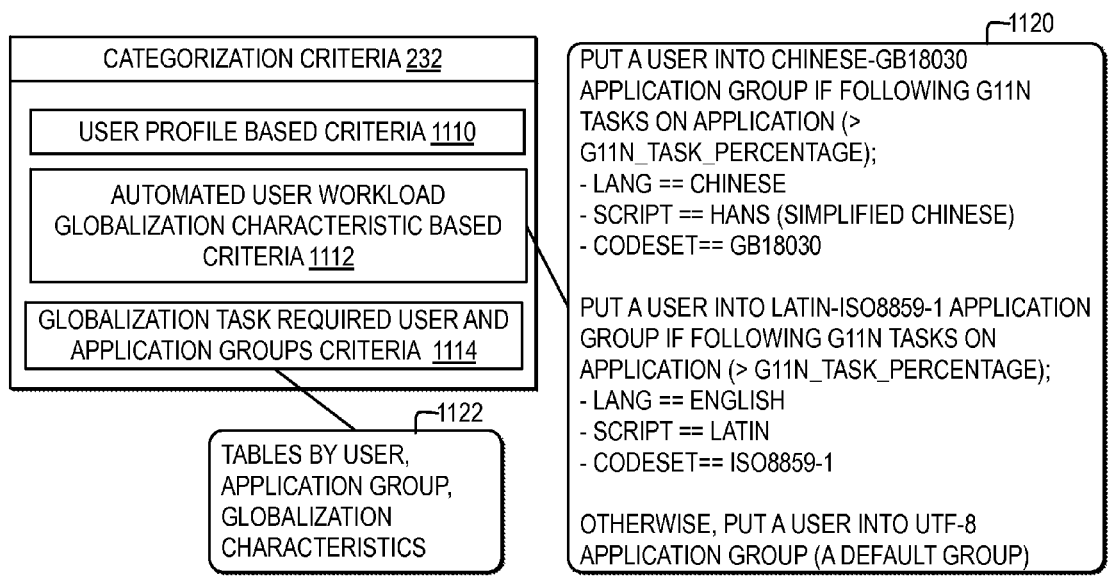
FIG. 11 illustrates one example of a block diagram of components of categorization criteria applied in the categorized rules.

FIG. 11 illustrates one example of a block diagram of components of categorization criteria applied in the categorized rules.

In one example, categorization criteria 232 may include one or more types of criteria for application by platform categorization controller 210, application categorization controller 212, current workload categorization controller 214, and user account manager 260. In addition, categorization criteria 232 may be applied to adjust the other rules within categorized rules 220. Categorization criteria 232 may include, but is not limited to, rules, algorithms, modules, engines, and data.

In one example, categorization criteria 232 may include user profile based criteria 1110. In one example, user profile based criteria 1110 may include user specified globalization patterns, and rules for applying to the patterns. In one example, categorization criteria 232 may include an assessment component that assists a user in defining the user's globalization patterns, such as the user's typical globalization characteristics use during particular periods of time. In one example, the assessment component may ask the user a selection of globalization related questions and based on the user responses to the questions, create a user's virtualized application service patterns, along with rules for applying to the patterns, to minimize globalization optimization overhead for different globalization characteristics typically required by a user. In one example, based on the user's patterns, the user profile based criteria 1110 may set globalization thresholds for the user, to be applied by other rules in categorization criteria 232.

In one example, categorization criteria 232 may include one or more automated user workload globalization characteristic based criteria 1112. In one example, automated user workload globalization characteristic based criteria 1112 includes criteria that enables dynamic categorization manager 114, through the controller and manager components, to automatically put user workloads into an application group or move the user workloads into an application group, and update user group information. In one example illustrated at reference numeral 1120, automated user workload globalization characteristic based criteria 1112 may include a selection of rules set for a particular user, where for the user, there is a threshold globalization setting of GllN_TASK_PERCENTAGE at 80%, to allow dynamic categorization manager 114 to assess a user's pattern on an application service for email applications. In one example, based on a user's pattern of globalization characteristics in workload requests, set at 80%, as illustrated at reference numeral 1120, a user is placed into a "CHINESE-GB18030" application group optimized for handling a language of "Chinese" and a code set of "GB18030" if the globalization tasks on an application that include a language of "Chinese", a script of "HANS (simplified Chinese)", and a code set of "GB18030", reaches greater than 80% of the workload requests. In the example, as illustrated at reference numeral 1120, a user is placed into a "LATIN-ISO8859-1" application group optimized for handling a language of "English" and a code set of "ISO8859-1" if the globalization tasks on an application that include a language of "English", a script of "Latin", and a code set of "ISO8859-1", reaches greater than 80% of the workload requests. In the example, as illustrated at reference numeral 1120, a user is placed into a "UTF-8" application group, which is a default group optimized for handling a code set of "UTF-8", if the other conditions fail. In one example, current workload categorization controller 214 may apply the rules illustrated at reference numeral 1120 in order to determine whether the current application group assigned to the user is the right application group, or whether to change the user to another application. In one example, user account manager 260 may maintain a history of the globalization characteristics in user workloads such current workload categorization controller 214 may determine whether a globalization threshold is reached. In one example, automated user workload globalization characteristic based criteria 1112 may be specified for a particular user, a type of user, or a user group and may be applied individually to a particular user or applied to a type of user or user group. In additional or alternate examples, automated user workload globalization characteristic based criteria 1112 may include additional or alternate types of thresholds, conditions and actions included in the criteria.

In one example, categorization criteria 232 may include one or more globalization task required user and application groups criteria 1114. In one example, globalization task required user and application groups criteria 1114 may include criteria for categorizing user and application groups for different globalization characteristics, for customizing the, further categorized based on code set, geo-locations, business mode, OS, peak hours, and other factors. In one example, For example, FIG. 12 and FIG. 13 illustrate one example of criteria for categorizing user and application groups for different code sets.

For example, table 1200 in FIG. 12 illustrates one example of a table specifying, by user and by application, the major code set requirement for each application. In the example, each user is identified by a user name from among "user 1", "user 2", "user 3", "user 4", "user 5", "user 6", and "user 7" and each application (app) is identified by an application number of 1-6. In the example, the major code set required by each user for each application is selected from among the code sets of "UTF-8", "GB18030", "ISO8859-1", "JIS", "IBM-eudJP", and "IBM-eucCN". In the example, the data in table 1200 may be compiled from user profiles or may be set by users or a service provider. In addition, in the example, the data in table 1200 may be further specified in the categorized rules for application based on additional factors.

For example, table 1300 in FIG. 13 illustrates one example of a table specifying, by application group categorization and application, the user assignments to application groups. In the example, each application (app) is identified in table 1200 is identified by an application number of 1-6 and each major code set identified in table 1200 is identified as a code set based application group, from among "UTF-8 group", "GB18030 group", "ISO8859-1 group", "JIS group", "IBM-eucJP group", and "IBM-eucCN group". In the example, the assignment information in table 1200 is categorized in table 1300 to specify which users to assign to each application group and specifies user group assignments.

In one example, globalization task required user and application groups criteria 1114 may specify tables, such as table 1200 and table 1300, by one or more additional factors, such as time of day or peak load times, to optimize globalization services configured in partition and application group categorizations. User account manager 260 may track workload globalization characteristics, compare actual usage with previous settings in the tables, and dynamically adjust the settings in table 1200 and table 1300, and in other globalization task required user and application groups criteria 1114, based on actual globalization characteristic usage.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 14:
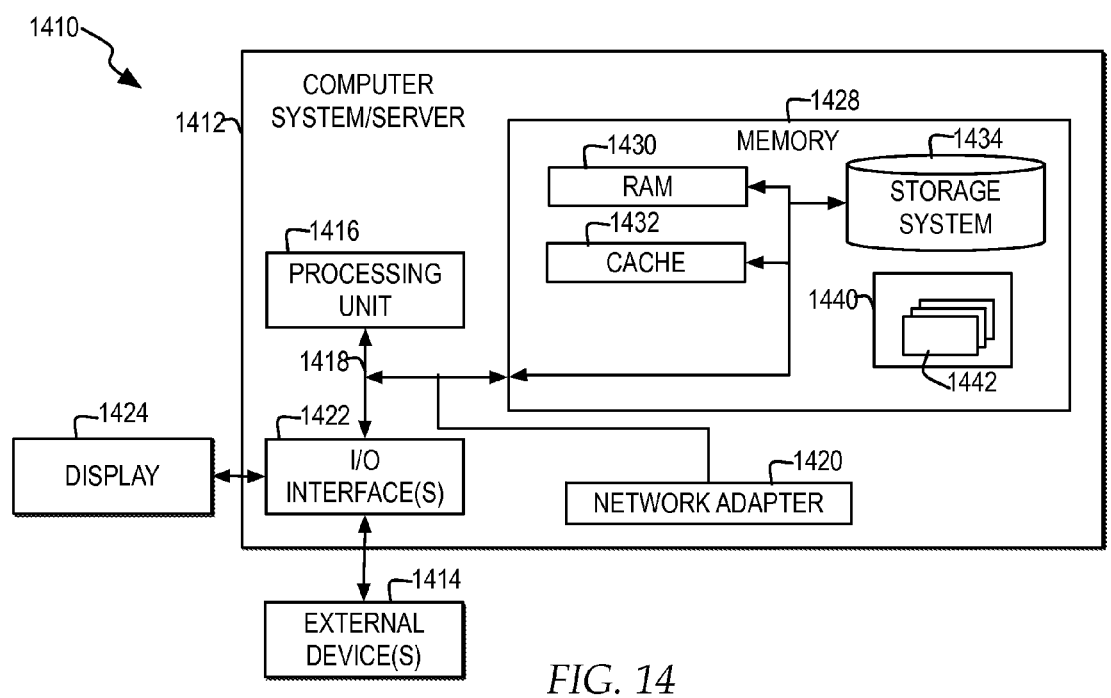
FIG. 14 illustrates one example of a block diagram of a cloud computing node, which may be implemented in a cloud computing environment.

Referring now to FIG. 14, a schematic of an example of a cloud computing node is shown. Cloud computing node 1410 is only one example of a suitable cloud computing node and is not intended to suggest any limitation as to the scope of use or functionality of embodiments of the invention described herein. Regardless, cloud computing node 1410 is capable of being implemented and/or performing any of the functionality set forth hereinabove.

In cloud computing node 1410 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 1412 in cloud computing node 1410 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 30 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 15:
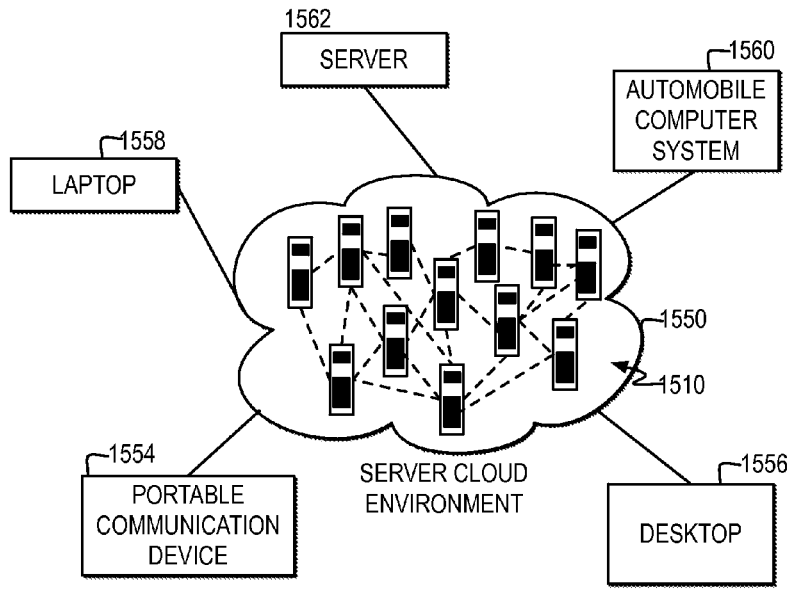
FIG. 15 illustrates one example of a block diagram of a cloud computing environment.

FIG. 15 illustrates a block diagram of one example of a cloud computing environment. In one example, a cloud computing environment 1550 is representative of a cloud environment supported in FIG. 1. As shown, cloud computing environment 1550 comprises one or more cloud computing nodes 1510 with which local computing devices used by cloud consumers, such as, for example, personal communication device 1554, which may include, but is not limited to, a personal digital assistant (PDA) or cellular telephone, a desktop computer 1556, a laptop computer 1558, automobile computer system 1560, and server 1562 may communicate. Nodes 1510 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices shown in FIG. 15 are intended to be illustrative only and that computing nodes 1510 and cloud computing environment 1550 can communicate with any type of computerized device over any type of network and/or network addressable connection (e.g., using a web browser).

Figure 16:
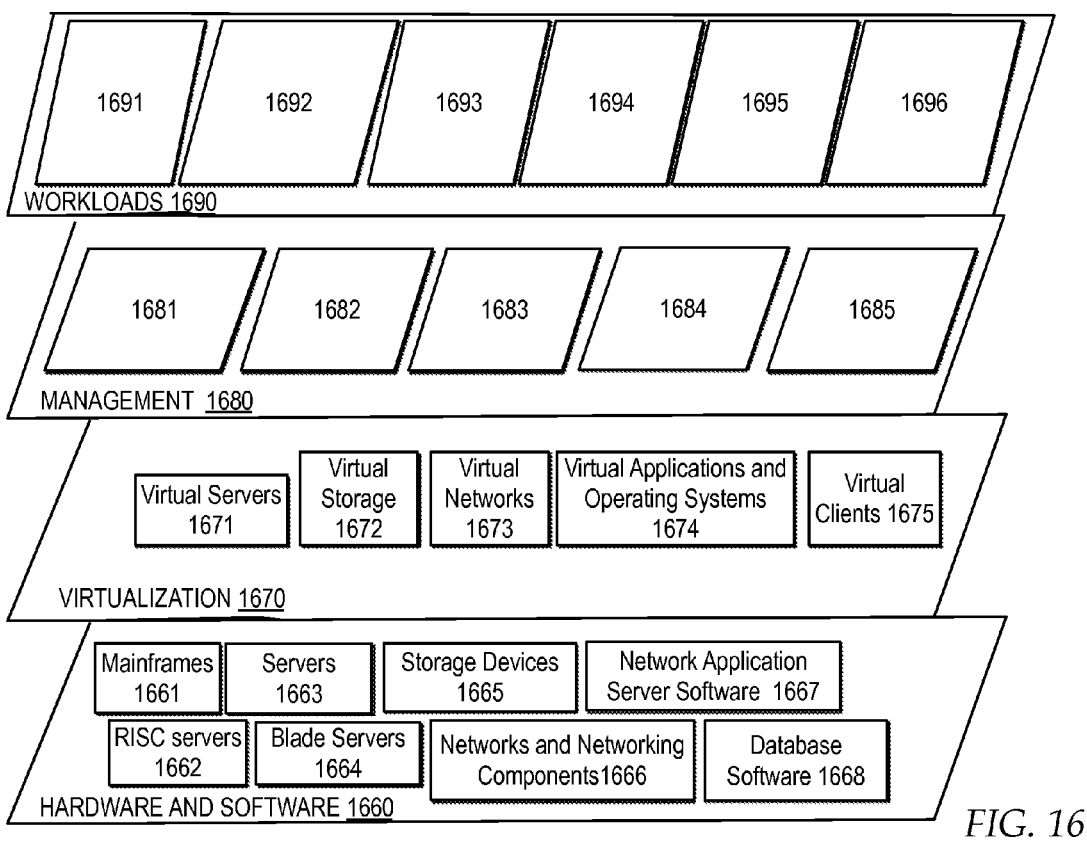
FIG. 16 illustrates one example of a block diagram of a set of functional abstraction layers provided by a cloud computing environment.

Referring now to FIG. 16, a set of functional abstraction layers provided by a cloud computing environment 1550 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 1660 includes hardware and software components. Examples of hardware components include: mainframes 1661; RISC (Reduced Instruction Set Computer) architecture based servers 1662; servers 1663; blade servers 1664; storage devices 1665; and networks and networking components 1666. In some embodiments, software components include network application server software 1667 and database software 1668.

Virtualization layer 1670 provides an abstraction layer from which the following examples of virtual entities may be provided: virtual servers 1671; virtual storage 1672; virtual networks 1673, including virtual private networks; virtual applications and operating systems 1674; and virtual clients 1675.

In one example, management layer 1680 may provide the functions described below. Resource provisioning 1681 provides dynamic procurement of computing resources and other resources that are utilized to perform tasks within the cloud computing environment. Metering and Pricing 1682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1683 provides access to the cloud computing environment for consumers and system administrators. Service level management 1684 provides cloud computing resource allocation and management such that required service levels are met. Service Level Agreement (SLA) planning and fulfillment 1685 provide pre-arrangement for, and procurement of, cloud computing resources for which a future requirement is anticipated in accordance with an SLA.

Workloads layer 1690 provides examples of functionality for which the cloud computing environment may be utilized. Examples of workloads and functions which may be provided from this layer may include, but are not limited to: mapping and navigation 1691; software development and lifecycle management 1692; virtual classroom education delivery 1693; data analytics processing 1694; transaction processing 1695; and globalization categorizer 1696. In one example, globalization categorizer 1696 may managing categorizations of workloads from users for a virtualization service based on the globalization characteristics of the workloads, in order to dynamically manage distribution of workloads in cloud computing environments to virtualized environments with optimized globalization configurations to handle the globalization characteristics of the workloads. Other server cloud functions may include one or more of the functions of virtualization service 110, management layer 112, dynamic categorization manager 114, applications 120, platforms 122, infrastructure 124, and globalization services 126.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart d/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A system for dynamically managing workload placements in virtualized environments, comprising:
    a processor, coupled with a memory, and configured to perform the actions of:
    receiving a plurality of workloads from a plurality of users requesting access to at least one virtualized application, each of the plurality of workloads specified with one or more separate globalization characteristics from among a plurality of globalization characteristics; and
    selectively categorizing each of the plurality of workloads separately for placement in one or more particular virtualized environments from among a plurality of virtualized environments based on the one or more separate globalization characteristics of each of the workloads, each virtualized environment comprising the at least one virtualized application configured for a separate selection of globalization services from among a plurality of globalization services for handling a separate selection of the one or more separate globalization characteristics, by:
    loading one or more application pool settings for a plurality of applications, each of the plurality of applications enabled for virtualization at the at least one virtualized application within the plurality of virtualized environments;
    loading at least one categorized rule for a platform hosting the plurality of applications, each at least one categorized rule specifying a rule for selecting at least one globalization characteristic from among the plurality of globalization characteristics for at least one application group;
    categorizing the plurality of applications into a plurality of categorized application groups according to the at least one categorized rule, each of the plurality of categorized application groups specified by a separate selection of at least one globalization characteristic from among the plurality of globalization characteristics;
    selectively assigning, according to the at least one categorized rule, a particular user to at least one particular application group in a user profile for the particular user;
    in response to receiving, from the particular user, at least one first workload from among the plurality of workloads, assigning the workload to the particular application group, the at least one first workload specified by a first globalization characteristic from among the plurality of globalization characteristics;
    determining, according to the at least one categorized rule, whether the particular application group is the right application group for handling the at least one first workload according to the first globalization characteristic; and in response to determining the particular application group is not the right application group for handling the at least one first workload, switching the at least one first workload to another application group from among the plurality of application groups according to the at least one categorized rule and assigning the another application group to the user profile for the particular user.

2. The system according to claim 1, wherein the processor is further configured to perform the actions of:
receiving the plurality of workloads from the plurality of users by a virtualization service that provides access to at least one application as the at least one the virtualized application through at least one of the plurality of virtualized environments, the virtualization service providing access to the plurality of users to the at least one virtualized application according to an agreement that each of the plurality of users pays for use of the virtualized application as the virtualized application is used, the virtualized service providing and managing the at least one virtualized application running on a platform and infrastructure within the at least one of the plurality of virtualized environments.

3. The system according to claim 1, wherein the processor is further configured to perform the actions of:
dynamically categorizing a plurality of partitions of a platform each according to at least one globalization characteristic from among the plurality of globalization characteristics, each of the plurality of partitions hosting a separate virtualized environment from among the plurality of virtualized environments;
selectively categorizing a first workload from among the plurality of workloads, from a particular user from among the plurality of users, specified by a first globalization characteristic from among the plurality of globalization characteristics, for a first partition from among the plurality of partitions, the first partition categorized for the first globalization characteristic; and
in response to receiving, from the particular user, a second workload from among the plurality of workloads specified by a second globalization characteristic from among the plurality of globalization characteristics, selectively categorizing the second workload from among the plurality of workloads for a second partition from among the plurality of partitions, the second partition categorized for the second globalization characteristic.

4. The system according to claim 3, wherein the processor is further configured to perform the actions of:
responsive to receiving the second workload specified by the second globalization characteristic, dynamically adjusting a categorization of the second partition from among the plurality of partitions to the second globalization characteristic.

5. The system according to claim 1, wherein the processor is further configured to perform the actions of:
accessing a threshold setting for the particular user from the user profile;
calculating whether a percentage of the at least one first workload is set to the first globalization characteristic for the particular application group and exceeds the threshold, according to the at least one categorized rule;
in response to detecting a first percentage of the at least one first workload set to the first globalization characteristic for the particular application group exceeds the threshold, determining the particular application group is the right application group; and
in response to detecting the first percentage of the at least one first workload set to the first globalization characteristic for the particular application group does not exceed the threshold, determining the particular application group is not the right application group.

6. The system according to claim 1, wherein the processor is further configured to perform the actions of:
dynamically assigning each of the plurality of workloads to a separate application group from among the plurality of application groups, each application group comprising the at least one virtualized application and specified for at least one separate globalization characteristic from among the plurality of globalization characteristics, wherein a selection of the plurality of workloads comprising a same at least one globalization characteristic from among the plurality of globalization characteristics share a same application group specified for the same at least one globalization characteristic from among the plurality of application groups.

7. A computer program product for dynamically managing workload placements in virtualized environments, the computer program product comprising a computer readable storage medium having program instructions embodied therewith, wherein the computer readable storage medium is not a transitory signal per se, the program instructions executable by a processor to cause the processor to:
receive a plurality of workloads from a plurality of users requesting access to at least one virtualized application, each of the plurality of workloads specified with one or more separate globalization characteristics from among a plurality of globalization characteristics; and
selectively categorize each of the plurality of workloads separately for placement in one or more particular virtualized environments from among a plurality of virtualized environments based on the one or more separate globalization characteristics of each of the workloads, each virtualized environment comprising the at least one virtualized application configured for a separate selection of globalization services from among a plurality of globalization services for handling a separate selection of the one or more separate globalization characteristics, by comprising program instructions executable by the processor to cause the processor to:
load one or more application pool settings for a plurality of applications, each of the plurality of applications enabled for virtualization at the at least one virtualized application within the plurality of virtualized environments;
load at least one categorized rule for a platform hosting the plurality of applications, each at least one categorized rule specifying a rule for selecting at least one globalization characteristic from among the plurality of globalization characteristics for at least one application group;
categorize the plurality of applications into a plurality of categorized application groups according to the at least one categorized rule, each of the plurality of categorized application groups specified by a separate selection of at least one globalization characteristic from among the plurality of globalization characteristics;
selectively assign, according to the at least one categorized rule, a particular user to at least one particular application group in a user profile for the particular user;
in response to receiving, from the particular user, at least one first workload from among the plurality of workloads, assign the workload to the particular application group, the at least one first workload specified by a first globalization characteristic from among the plurality of globalization characteristics;

determine, according to the at least one categorized rule, whether the particular application group is the right application group for handling the at least one first workload according to the first globalization characteristic; and in response to determining the particular application group is not the right application group for handling the at least one first workload, switch the at least one first workload to another application group from among the plurality of application groups according to the at least one categorized rule and assigning the another application group to the user profile for the particular user.

8. The computer program product according to claim 7, further comprising the program instructions executable by a processor to cause the processor to:

receive the plurality of workloads from the plurality of users by a virtualization service that provides access to at least one application as the at least one the virtualized application through at least one of the plurality of virtualized environments, the virtualization service providing access to the plurality of users to the at least one virtualized application according to an agreement that each of the plurality of users pays for use of the virtualized application as the virtualized application is used, the virtualized service providing and managing the at least one virtualized application running on a platform and infrastructure within the at least one of the plurality of virtualized environments.

9. The computer program product according to claim 7, further comprising the program instructions executable by a processor to cause the processor to:

dynamically categorize a plurality of partitions of a platform each according to at least one globalization characteristic from among the plurality of globalization characteristics, each of the plurality of partitions hosting a separate virtualized environment from among the plurality of virtualized environments;

selectively categorize a first workload from among the plurality of workloads, from a particular user from among the plurality of users, specified by a first globalization characteristic from among the plurality of globalization characteristics, for a first partition from among the plurality of partitions, the first partition categorized for the first globalization characteristic; and in response to receiving, from the particular user, a second workload from among the plurality of workloads specified by a second globalization characteristic from among the plurality of globalization characteristics, selectively categorize the second workload from among the plurality of workloads for a second partition from among the plurality of partitions, the second partition categorized for the second globalization characteristic.

10. The computer program product according to claim 9, further comprising the program instructions executable by a processor to cause the processor to:

responsive to receiving the second workload specified by the second globalization characteristic, dynamically adjust a categorization of the second partition from among the plurality of partitions to the second globalization characteristic.

11. The computer program product according to claim 7, further comprising the program instructions executable by a processor to cause the processor to:

access a threshold setting for the particular user from the user profile;

calculate whether a percentage of the at least one first workload is set to the first globalization characteristic for the particular application group and exceeds the threshold, according to the at least one categorized rule;

in response to detecting a first percentage of the at least one first workload set to the first globalization characteristic for the particular application group exceeds the threshold, determine the particular application group is the right application group; and in response to detecting the first percentage of the at least one first workload set to the first globalization characteristic for the particular application group does not exceed the threshold, determine the particular application group is not the right application group.

* * * * *